(12) United States Patent
Iwamitsu et al.

(10) Patent No.: US 11,256,582 B2
(45) Date of Patent: *Feb. 22, 2022

(54) SYSTEM, AND CONTROL METHOD AND PROGRAM FOR INPUT/OUTPUT REQUESTS FOR STORAGE SYSTEMS

(71) Applicant: Hitachi, Ltd., Tokyo (JP)

(72) Inventors: Kouji Iwamitsu, Tokyo (JP); Takuya Ogusu, Tokyo (JP); Keisuke Suzuki, Tokyo (JP); Masayuki Gomyo, Tokyo (JP); Shinri Inoue, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 28 days.

This patent is subject to a terminal disclaimer.

(21) Appl. No.: 16/845,891

(22) Filed: Apr. 10, 2020

(65) Prior Publication Data

US 2020/0241982 A1   Jul. 30, 2020

Related U.S. Application Data

(63) Continuation of application No. 16/281,327, filed on Feb. 21, 2019, now Pat. No. 10,635,551, which is a
(Continued)

(30) Foreign Application Priority Data

Nov. 30, 2017 (JP) .............................. JP2017-231216

(51) Int. Cl.
    *G06F 11/20* (2006.01)
(52) U.S. Cl.
    CPC ...... *G06F 11/2033* (2013.01); *G06F 11/2089* (2013.01); *G06F 11/2092* (2013.01); *G06F 11/2094* (2013.01)

(58) Field of Classification Search
    CPC ............. G06F 11/2033; G06F 11/2089; G06F 11/2092; G06F 11/2094
    See application file for complete search history.

(56) References Cited

U.S. PATENT DOCUMENTS

7,802,131 B2   9/2010   Watanabe et al.
8,612,561 B2   12/2013   Ni
(Continued)

FOREIGN PATENT DOCUMENTS

JP   2006-085398 A   3/2006

OTHER PUBLICATIONS

Japanese Office Action dated Nov. 5, 2019 directed to the JP counterpart application No. 2017-231216 with machine translation (10 pages).

*Primary Examiner* — Joseph R Kudirka
(74) *Attorney, Agent, or Firm* — Procopio, Cory, Hargreaves & Savitch LLP

(57) ABSTRACT

Virtual first logical volumes are provided to a host, a virtual second logical volume correlated with any one of the first logical volumes is created in a storage node in correlation with a storage control module disposed in the storage node, a correspondence relationship between the first and second logical volumes is managed as mapping information, a storage node which is an assigning distribution of an I/O request is specified on the basis of the mapping information in a case where the I/O request in which the first logical volume is designated as an I/O destination is given from the host, the I/O request is assigned to the storage control module of its own node in a case where the specified storage node is its own node, and the I/O request is assigned to another storage node in a case where the specified storage node is another storage node.

10 Claims, 14 Drawing Sheets

Related U.S. Application Data continuation of application No. 15/917,359, filed on Mar. 9, 2018, now Pat. No. 10,229,021.

(56) References Cited

U.S. PATENT DOCUMENTS

| | | |
|---|---|---|
| 8,700,948 B2 | 4/2014 | Masaki et al. |
| 8,959,389 B2 | 2/2015 | Kulkarni |
| 10,152,230 B1 | 12/2018 | Xiong et al. |
| 10,152,250 B1 | 12/2018 | Xiong et al. |
| 2009/0265510 A1 | 10/2009 | Walther et al. |
| 2016/0173598 A1 | 6/2016 | Amit et al. |
| 2017/0017433 A1 | 1/2017 | Ishikawa et al. |

FIG. 5

STORAGE CONTROL MODULE PAIR TABLE 30

| PAIR NUMBER (30A) | ACTIVE (30B) | | PASSIVE (30C) | |
| --- | --- | --- | --- | --- |
| | NODE NUMBER (30BA) | SC MODULE NUMBER (30BB) | NODE NUMBER (30CA) | SC MODULE NUMBER (30CB) |
| 1 | 0 | 0 | 1 | 1 |
| ... | ... | ... | ... | ... |

FIG. 6

FE TABLE VOLUME TABLE 31

| HVOL NUMBER | UUID | NODE SPECIFYING INFORMATION 1 | NODE SPECIFYING INFORMATION 2 | ACTIVE SIDE NODE SPECIFYING INFORMATION | SC NUMBER | VIRTUAL PORT NUMBER | INTERNAL VOL NUMBER |
|---|---|---|---|---|---|---|---|
| 1 | Xxxxxxxxx | sn1 | sn2 | sn1 | 1 | Cl1-a | 1 |
| ... | ... | ... | ... | ... | ... | ... | ... |
| 31A | 31B | 31C | 31D | 31E | 31F | 31G | 31H |

MAPPING TABLE 32

FIG. 8
FE TARGET TABLE 33

| TARGET NUMBER | TARGET NAME | UUID | TARGET IP | HVOL NUMBER LIST | INITIATOR NAME |
|---|---|---|---|---|---|
| 1 | AAAA | Xxxxxxxxx | xx.xx.xx.xx | 1,2,...,N | Lqn.xxxx.xxx |
| ... | ... | ... | ... | ... | ... |
| 33A | 33B | 33C | 33D | 33E | 33F |

FIG. 9

SC MODULE CONFIGURATION INFORMATION MANAGEMENT TABLE 34

| VIRTUAL PORT NUMBER | IVOL NUMBER |
|---|---|
| CI1-a | 1 |
| ... | ... |
| 34A | 34B |

FIG. 10

GLOBAL POOL VOLUME TABLE 35

| GVOL NUMBER | TARGET NUMBER | HVOL NUMBER |
|---|---|---|
| 1 | 1 | 1 |
|   | 2 | 1 |
|   | ... | ... |
| ... | ... | ... |
| 35A | 35B | 35C |

SYSTEM, AND CONTROL METHOD AND PROGRAM FOR INPUT/OUTPUT REQUESTS FOR STORAGE SYSTEMS

CROSS-REFERENCE TO RELATED PATENT APPLICATION

This application is a continuation of U.S. patent application Ser. No. 16/281,327 filed Feb. 21, 2019, and titled "SYSTEM, AND CONTROL METHOD AND PROGRAM FOR INPUT/OUTPUT REQUESTS FOR STORAGE SYSTEMS," which is a continuation of U.S. patent application Ser. No. 15/917,359 filed Mar. 9, 2018, now U.S. Pat. No. 10,229,021, issued on Mar. 12, 2019, and titled "SYSTEM, AND CONTROL METHOD AND PROGRAM FOR INPUT/OUTPUT REQUESTS FOR STORAGE SYSTEMS," which claims the benefit of Japanese Patent Application No. 2017-231216 filed Nov. 30, 2017. The entire content of the above identified application is incorporated herein by reference.

BACKGROUND OF THE INVENTION

Field of the Invention

The present invention relates to a system, and a control method and a program for the system, and is suitable to be applied to, for example, an information processing system including a plurality of storage nodes in each of which one or a plurality of software defined storages (SDSs) are installed. Hereinafter, the SDS indicates a storage device built by installing software having a storage function in a general purpose server apparatus.

Background Art

In the related art, existing control software (storage control software) used for a controller of a storage device is configured as a dedicated item corresponding to hardware in which the storage control software is installed. Thus, if the storage control software is merely installed in a bare metal server without being changed, there is a problem in that it is difficult to form a scale-out configuration due to a difference between architectures.

This is because such existing storage control software is configured to be intended for only a process completed in a storage device thereof, and thus the existing storage control software cannot be used for a scale-out configuration. The following US-A-2017/0017433 discloses that off-road data copying is performed in cooperation between two storage devices with an HA configuration, but this is only the cooperation between the two storage devices.

A process in a shared memory performed by the existing storage control software depends on hardware, and thus there is also a problem in that the same process cannot be performed in a general purpose server apparatus.

In contrast, in recent years, development of an SDS built by installing storage control software in a general purpose server apparatus has progressed. The SDS does not require dedicated hardware, and has high expandability, and thus the demand therefor tends to increase. As a technique related to such an SDS, for example, the following US-A-2016/0173598 discloses a technique of transmitting input/output (I/O) between servers with an SDS configuration.

SUMMARY OF THE INVENTION

However, in recent years, an amount of data accumulated in companies, government agencies, and the like has been increasing. In consideration of such a situation, a storage device is preferably configured to be easily scaled out.

Even after scale-out is executed, if a system can be built such that a host apparatus can easily access desired data without being aware of a storage device which is to be set as an issue destination of an I/O request, setting of a host apparatus after scale-out is unnecessary, and thus expandability of the system may be improved.

The present invention has been made in consideration of the above-described circumstances, and is to propose a system, and a control method and a program for the system, capable of improving expandability.

In order to solve the above-described problem, according to the present invention, there is provided a system including a cluster formed of a plurality of storage nodes, in which each of the storage nodes includes a storage control module that performs I/O processes based on an assigned input/output (I/O) request, and a frontend module that assigns the I/O request given from a host apparatus to the storage control module of its own node or corresponding another storage node, in which one or a plurality of virtual first logical volumes are provided to the host apparatus as storage regions for reading and writing data, and a virtual second logical volume correlated with any one of the first logical volumes is created in the storage node in correlation with the storage control module disposed in the storage node, in which the host apparatus transmits the I/O request in which the first logical volume is designated as an I/O destination to the storage node, and in which the frontend module manages a correspondence relationship between the first and second logical volumes as mapping information, and specifies the storage node in which the storage control module correlated via the first logical volume designated as an I/O destination in the I/O request and the second logical volume is disposed on the basis of the mapping information in a case where the I/O request is given from the host apparatus, assigns the I/O request to the storage control module of its own node in a case where the specified storage node is its own node, and assigns the I/O request to another storage node in a case where the specified storage node is another storage node.

According to the present invention, there is provided a control method for a system including cluster formed of a plurality of storage nodes, each of the storage nodes including a storage control module that performs I/O processes based on an assigned input/output (I/O) request, and one or a plurality of virtual first logical volumes being provided to the host apparatus as storage regions for reading and writing data, the control method including a first step of creating a virtual second logical volume correlated with any one of the first logical volumes in the storage node in correlation with the storage control module disposed in the storage node, and managing a correspondence relationship between the first and second logical volumes as mapping information in each of the storage nodes; a second step of specifying the storage node in which the storage control module correlated via the first logical volume designated as an I/O destination in the I/O request and the second logical volume is disposed on the basis of the mapping information in a case where the I/O request in which the first logical volume is designated as an I/O destination is given from the host apparatus; and a third step of assigning the I/O request to the storage control module of its own node in a case where the specified storage node is its own node, and assigning the I/O request to another storage node in a case where the specified storage node is another storage node.

According to the present invention, there is provided a program executed in a storage node in a system including cluster formed of a plurality of the storage nodes, each of the storage nodes including a storage control module that performs I/O processes based on an assigned input/output (I/O) request, and one or a plurality of virtual first logical volumes being provided to the host apparatus as storage regions for reading and writing data, the program causing the storage node to execute a first step of creating a virtual second logical volume correlated with any one of the first logical volumes in the storage node in correlation with the storage control module disposed in the storage node, and managing a correspondence relationship between the first and second logical volumes as mapping information in each of the storage nodes; a second step of specifying the storage node in which the storage control module correlated via the first logical volume designated as an I/O destination in the I/O request and the second logical volume is disposed on the basis of the mapping information in a case where the I/O request in which the first logical volume is designated as an I/O destination is given from the host apparatus; and a third step of assigning the I/O request to the storage control module of its own node in a case where the specified storage node is its own node, and assigning the I/O request to another storage node in a case where the specified storage node is another storage node.

According to the system, and the control method and the program for the system of the present invention, a host apparatus can read and write desired data without being aware of a storage node which is an issue destination of an I/O request regardless of execution of scale-out of the storage node.

Advantageous Effects of Invention

According to the present invention, it is possible to realize a system, and a control method and a program for the system, capable of improving expandability. Problems, configurations, and effects other than those described above will become apparent through description of the following embodiments.

BRIEF DESCRIPTION OF THE DRAWINGS

FIG. 5 is a diagram illustrating a configuration example of a storage control module pair table.

FIG. 6 is a diagram illustrating a configuration example of a frontend table volume table.

FIG. 8 is a diagram illustrating a configuration example of a frontend target table.

FIG. 9 is a diagram illustrating a configuration example of a storage control module information management table.

FIG. 10 is a diagram illustrating a configuration example of a global pool volume table.

DETAILED DESCRIPTION OF THE INVENTION

Figure 1:
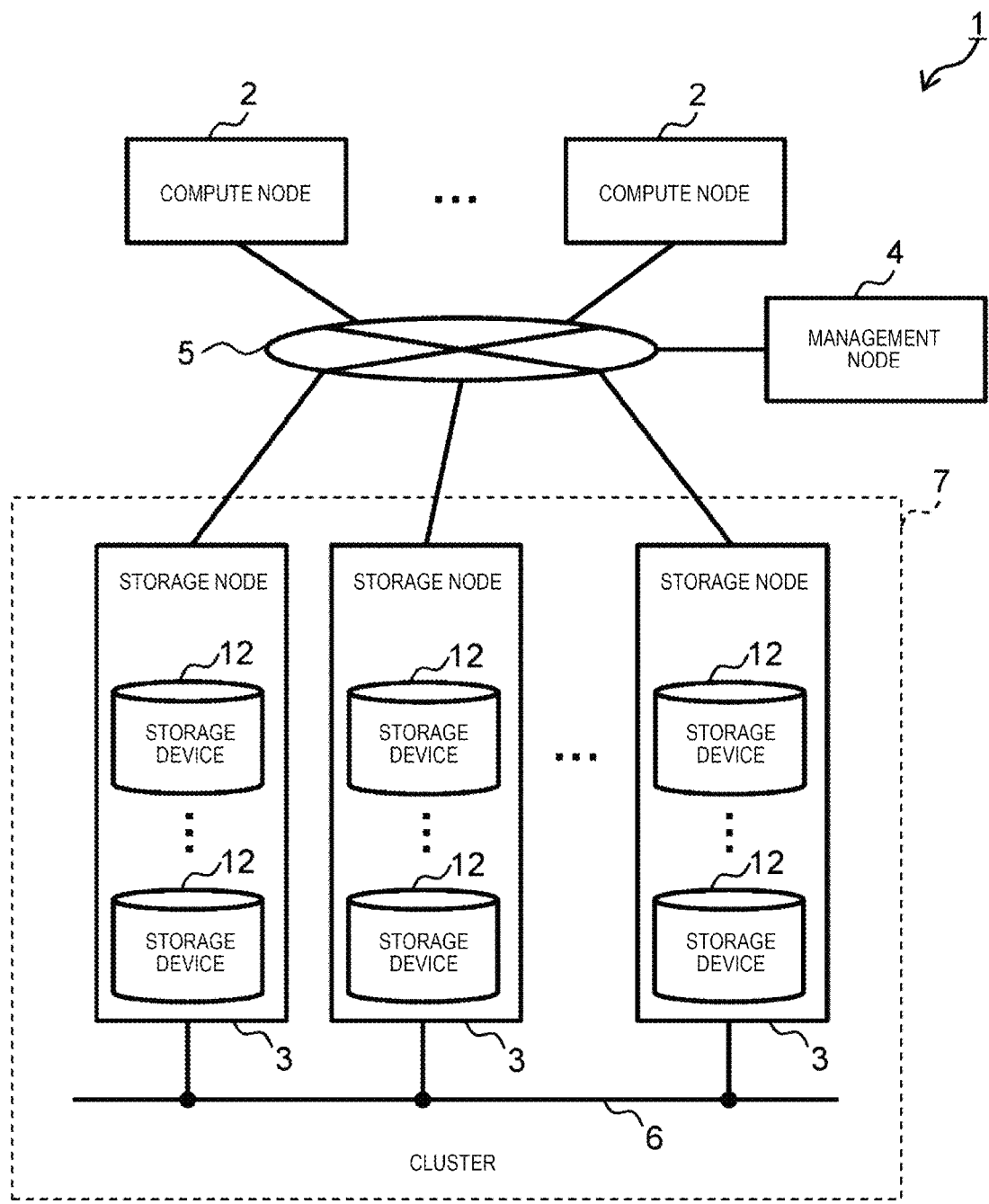
FIG. 1 is a block diagram illustrating the entire configuration of an information processing system according to the present embodiment.

Hereinafter, with reference to the drawings, an embodiment of the present invention will be described in detail. The following description and drawings are examples for explaining the present invention, and may be omitted and simplified for clarification of the description as appropriate. It cannot be said that all combinations of features described in the embodiment are essential to solving means of the invention. The present invention is not limited to the embodiment, and all application examples matching the spirit of the present invention are included in the technical scope of the present invention. A person skilled in the art may apply various additions or modifications to the present invention within the scope of the present invention. The present invention may be implemented in other various aspects. Each constituent element may be formed of a single element or a plurality of elements unless particularly limited.

In the following description, various pieces of information are described in expressions such as a "table", a "chart", a "list", and a "queue", but various pieces of information may be expressed by data structures other than the expressions. In order to indicate independence from a data structure, an "XX table", an "XX list", or the like will be referred to as "XX information" in some cases. In a case where the content of each piece of information is described, expressions such as "identification information", an "identifier", a "name", an "ID", and a "number" are used, but these can be replaced with each other.

In the following description, in a case where the same kind of elements are described without being differentiated from each other, a reference numeral or a common number in reference numerals may be used, and, in a case where the same kind of elements are described to be differentiated from each other, reference numerals of the elements may be used or IDs allocated to the elements may be used instead of the reference numerals.

In the following description, a process performed by executing a program will be described in some cases, but, the program is executed by at least one processor (for example, a CPU), and thus a defined process is performed by using a storage resource (for example, a memory) and/or an interface device (for example, a communication port) as appropriate. Therefore, the processor may be regarded to mainly perform the process. Similarly, the subject of processes performed by executing the program may be a controller, an apparatus, a system, a computer, a node, a storage system, a storage device, a server, a management computer, a client, or a host, having the processor. The subject (for example, a processor) of processes performed by executing the program may include a hardware circuit performing some or all of the processes. For example, the subject of processes performed by executing the program may include hardware circuits performing encryption and decryption, or compression and decompression. The processor operates as a functional unit which realizes a predetermined function by performing operations according to the program. An apparatus and a system including the processor are an apparatus and a system including such a functional unit.

The program may be installed into an apparatus such as a computer from a program source. The program source may be, for example, a program distribution server or a computer readable storage medium. In a case where the program source is the program distribution server, the program distribution server may include a processor (for example, a CPU) and a storage resource, and the storage resource may store a distribution program and a distribution target program. The processor of the program distribution server may execute the distribution program such that the processor of the program distribution server distributes the distribution target program to other computers. In the following description, two or more programs may be realized as a single program, and a single program may be realized as two or more programs.

(1) Configuration of Information Processing System of the Present Embodiment

FIG. 1 is a diagram illustrating an information processing system 1 of the present embodiment. The information processing system 1 is configured to include a plurality of compute nodes 2, a plurality of storage nodes 3, and a management node 4.

The compute nodes 2, the storage nodes 3, and the management node 4 are connected to each other via a storage service network 5 formed of, for example, a fibre channel (FC), Ethernet (registered trademark), InfiniBand, or a wireless local area network (LAN). The storage nodes 3 are connected to each other via a backend network 6 formed of Ethernet (registered trademark), InfiniBand, or a wireless LAN.

However, the storage service network 5 and the backend network 6 may be formed of the same network, and each compute node 2 and each storage node 3 may be connected to a management network other than the storage service network 5 or the backend network 6.

Each of the compute nodes 2 is a general purpose computer apparatus which functions as a host (host apparatus) for the storage nodes 3. The compute node 2 may be a virtual computer apparatus such as a virtual machine. The compute node 2 transmits a read request or a write request (hereinafter, collectively referred to as an input/output (I/O) request as appropriate) to the storage node 3 via the storage service network 5 in response to a user's operation or a request from an installed application program.

Figure 2:
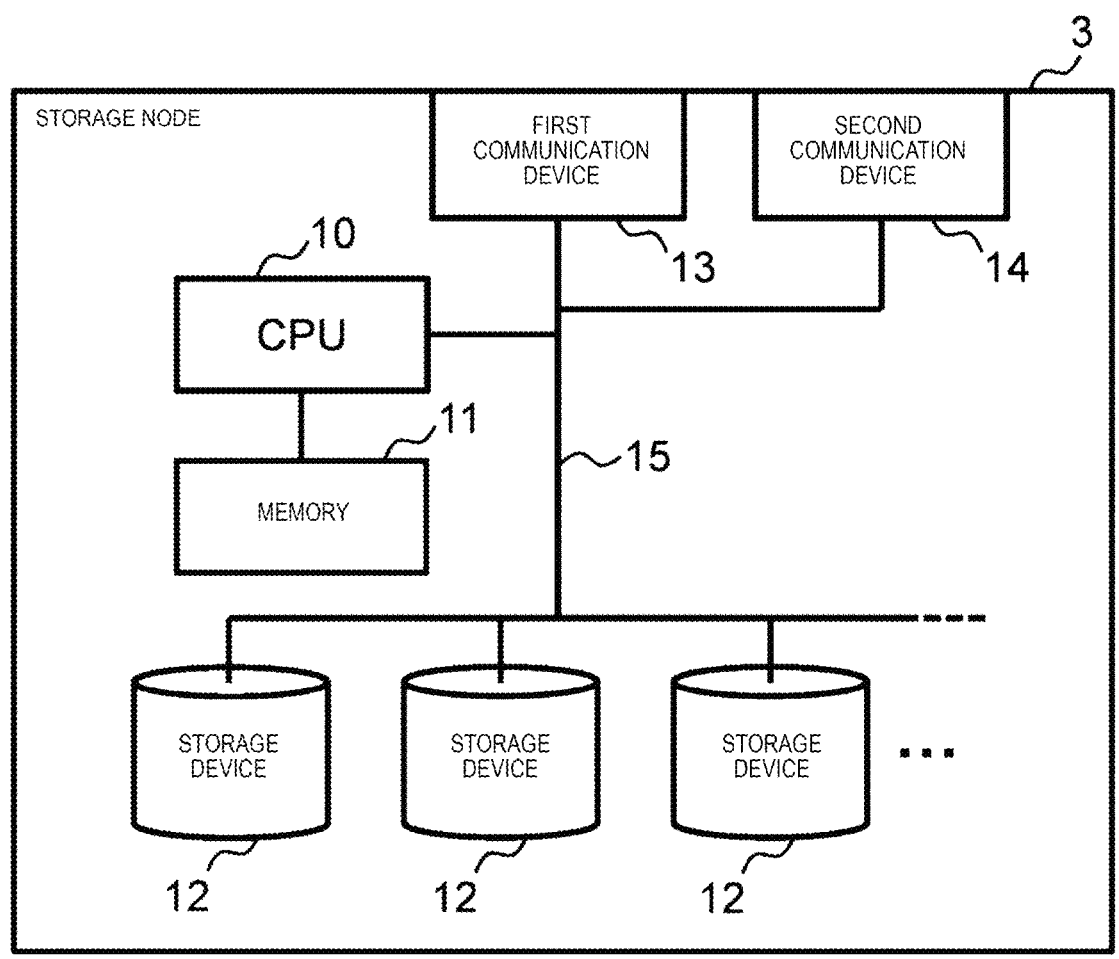
FIG. 2 is a block diagram illustrating a hardware configuration of a storage node.

The storage node 3 is a general purpose physical server apparatus providing a storage region for reading and writing data to the compute node 2. As illustrated in FIG. 2, the storage node 3 is configured to include a central processing unit (CPU) 10, a memory 11, a plurality of storage devices 12, and first and second communication devices 13 and 14, and the CPU 10, the storage devices 12, and the first and second communication devices 13 and 14 are connected to each other via an internal network 15. Each storage node 3 includes one or more CPUs 10, one or more memories 11, one or more storage devices 12, one or more first communication devices 13, and one or more second communication devices 14.

The CPU 10 is a processor controlling the entire operation of the storage node 3. The memory 11 is formed of a volatile semiconductor memory such as a static random access memory (SRAM) or a dynamic RAM (DRAM), and is used as a work memory of the CPU 10 in order to temporarily hold various programs or necessary data. The programs stored in the memory 11 are executed by at least one CPU 10, and thus various processes are performed in the entire storage node 3 as will be described later.

The storage device 12 is formed of a large-capacity nonvolatile storage device such as a non-volatile memory (NVMe) drive, a Serial Attached Small Computer System Interface (SCSI) (SAS) drive, Serial Advanced Technology Attachment (ATA) (SATA), a solid state drive (SSD), or a storage class memory (SCM), and provides a storage region for reading and writing data to the compute node 2.

The first communication device 13 is an interface used for the storage node 3 to perform communication with the compute node 2 or the management node 4 via the storage service network 5, and is formed of, for example, an FC card or a wireless LAN card. The first communication device 13 performs protocol control during communication with the compute node 2 or the management node.

The second communication device 14 is an interface for the storage node 3 to perform communication with other storage nodes 3 via the backend network 6, and is formed of, a network interface card (NIC) or a wireless LAN card. The second communication device 14 performs protocol control during communication with other storage nodes 3.

In a case of the present embodiment, as illustrated in FIG. 1, each storage node 3 is collected in a group called a cluster 7 along with another storage node or a plurality of other storage nodes 3, and is managed in the unit of the cluster 7. In the example illustrated in FIG. 1, a case where only one cluster 7 is set is illustrated, but a plurality of clusters 7 may be set in the information processing system 1. The cluster 7 may be referred to as a distributed storage system.

The management node 4 is a computer apparatus for a manager (hereinafter, referred to as a system manager) of the information processing system 1 to perform configuration management or various settings of the information processing system 1. The management node 4 gives a necessary instruction to the compute node 2 or the storage node 3 in response to the system manager's operation.

Figure 3:
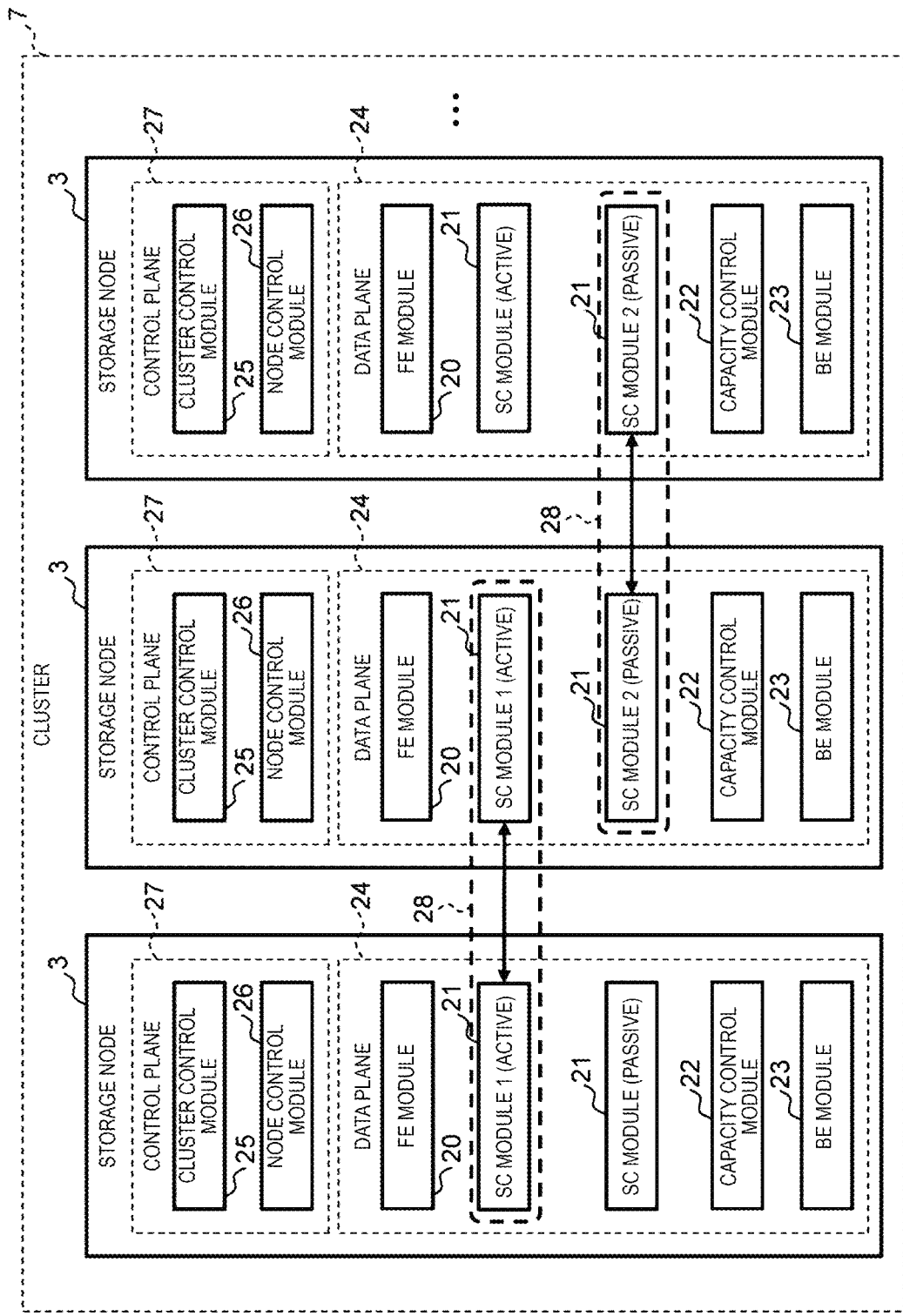
FIG. 3 is a block diagram illustrating a software configuration of the storage node.

FIG. 3 illustrates a logical configuration of the storage node 3 according to the present embodiment. As illustrated in FIG. 3, each storage node 3 is configured to include a data plane 24 including a frontend module 20, one or a plurality of storage control modules 21, a capacity control module 22, and a backend module 23, and a control plane 27 including a cluster control module 25 and a node control module 26. The data plane 24 is a functional unit performing I/O processes regarding reading and writing of data, and the control plane 27 is a functional unit controlling the entire cluster 7 (FIG. 1) or its own node.

The frontend module 20 is software which functions as a frontend of an I/O process regarding scale-out in the storage node 3. For example, in a case where an I/O request is sent from the compute node 2, the frontend module 20 assigns the I/O request to the storage control module 21 of its own node which has to execute the I/O request or to another storage node 3 in which the storage control module 21 having to execute the I/O request is disposed.

The storage control module 21 is software which functions as a controller of a software defined storage (SDS). The storage control module 21 may also be referred to as storage control software or a storage control program. The storage control module 21 receives an I/O request from the compute node 2, sent from the frontend module 20, and issues an I/O command corresponding to the received I/O request to the backend module 23.

Here, in a case of the present embodiment, each storage control module 21 installed in the storage node 3 is set in a pair forming a redundancy configuration along with another storage control module 21 disposed in another storage node 3. Hereinafter, this pair will be referred to as a storage control module pair 28.

FIG. 3 illustrates a case where a single storage control module pair 28 is formed by two storage control modules 21, and, also in the following description, a description will be made assuming that the storage control module pair 28 is formed by two storage control modules 21, but a single redundancy configuration may be formed by three or more storage control modules 21.

In the storage control module pair 28, one storage control module 21 is set to a state (which is an active system state and will be hereinafter referred to as an active mode) of being able to receives an I/O request from the compute node 2, and the other storage control module 21 is set to a state (which is a standby system state and will be hereinafter referred to as a passive mode) of not receiving an I/O request from the compute node 2.

In the storage control module pair 28, in a case where a failure occurs in the storage control module (hereinafter, as appropriate, referred to as an active storage control module) 21 set to an active mode or the storage node 3 in which the active storage control module 21 is disposed, a state of the storage control module (hereinafter, as appropriate, a passive storage control module) 21 set to a passive mode until then is switched to an active mode. Consequently, in a case where the active storage control module 21 cannot operate, an I/O process performed by the active storage control module 21 can be taken over to the passive storage control module 21 forming the same storage control module pair 28.

The capacity control module 22 is software having a function of allocating a physical storage region provided by the storage device 12 (FIG. 2) of its own node or another node, to the storage control module pair 28 formed by the active storage control module 21 disposed in its own node. The capacity control module 22 may also be referred to as capacity control software or a capacity control program.

The backend module 23 is software which functions as a backend of an I/O process in the storage node 3. For example, the backend module 23 reads and writes data into and from the storage region allocated to the storage control module pair 28 formed by the active storage control module 21 by the capacity control module 22 in response to the above-described I/O command given from the active storage control module 21.

On the other hand, the cluster control module 25 is software having a function of performing a control process regarding the entire cluster 7 or a control process regarding scale-out of the cluster 7. The cluster control module 25 may also be referred to as cluster control software or a cluster control program. In the information processing system 1, one cluster control module 25 is set as a master among the cluster control modules 25 installed in the respective storage nodes 3 in the cluster 7, and only the cluster control module (hereinafter, referred to as a master cluster control module) 25 set as a master performs various control processes while maintaining consistency of the entire cluster 7.

For example, the master cluster control module 25 sets the storage control module pair 28 in the cluster 7 in response to a request from the management node 4, and registers and manages the set storage control module pair 28 in a storage control module pair table 30 which will be described later in FIG. 5.

The cluster control modules 25 other than the master cluster control module 25 are set to any operation mode such as a hot standby mode or a warm standby mode in preparation for a failure in the master cluster control module 25.

The hot standby mode is an operation mode in which, in a case where a failure occurs in the master cluster control module 25 or the storage node 3 in which the master cluster control module 25 is installed, an activated standby state is maintained such that a process which is being performed by the master cluster control module 25 until then can be immediately taken over.

The cluster control module 25 in the hot standby mode holds management information with the same content as that of all pieces of management information managed by the master cluster control module 25, such as the storage control module pair table 30 (FIG. 5), so as to immediately take over a process which is being performed by the master cluster control module 25.

In a case where the management information held in the master cluster control module 25 is updated, a difference in the management information before and after being updated is sent as difference data to all of the cluster control modules 25 in the hot standby mode from the master cluster control module 25 via the backend network 6. Thus, the management information held in the cluster control modules 25 is updated in the same manner as the management information held in the master cluster control module 25 by the cluster control modules 25 on the basis of the difference data.

Since the cluster control module 25 in the hot standby mode holds the same management information as that of the master cluster control module 25 at all times, even in a case where a failure occurs in the master cluster control module 25 or the like, and the cluster control module 25 in the hot standby mode until then is switched to a "master", a control process which is being performed by the original master cluster control module 25 until then can be taken over to the cluster control module (master cluster control module) 25 switched to a "master".

The warm standby mode is an operation mode in a standby state in which activation is stopped. In a case where the number of cluster control modules set to the hot standby mode is equal to or less than a preset threshold value, a state of any one of the cluster control modules 25 set to the warm standby mode is switched to the hot standby mode.

In order to prevent a state in which two or more master cluster control modules 25 are present, the master cluster control module 25 operates three or more cluster control modules 25, and selects a master cluster control module from the among operated cluster control modules 25 through majority decision. The remaining operated cluster control modules 25 are set to the hot standby mode.

The node control module 26 is a program having a function of performing various control processes completed in its own node in response to a request from the master cluster control module 25. The node control module 26 may also be referred to as node control software or a node control program. Actually, the master cluster control module 25 requests the node control module 26 of each storage node 3 to perform a process completed in each storage node 3 such that a load does not concentrate thereon. If the request is given, the node control module 26 performs a control process on the data plane 24 of its own node in response to the request.

As mentioned above, in the information processing system 1, a command or a request is sent from the master cluster control module 25 to the frontend module 20 or the storage control module 21 of each storage node 3 via the node control module 26 of the storage node 3. However, in the following description, for better understanding, the description will be made assuming that a command or a request from the master cluster control module 25 for the frontend module 20 or the storage control module 21 of each storage node 3 is directly sent from the master cluster control module 25 to the frontend module 20 or the storage control module 21.

Figure 4:
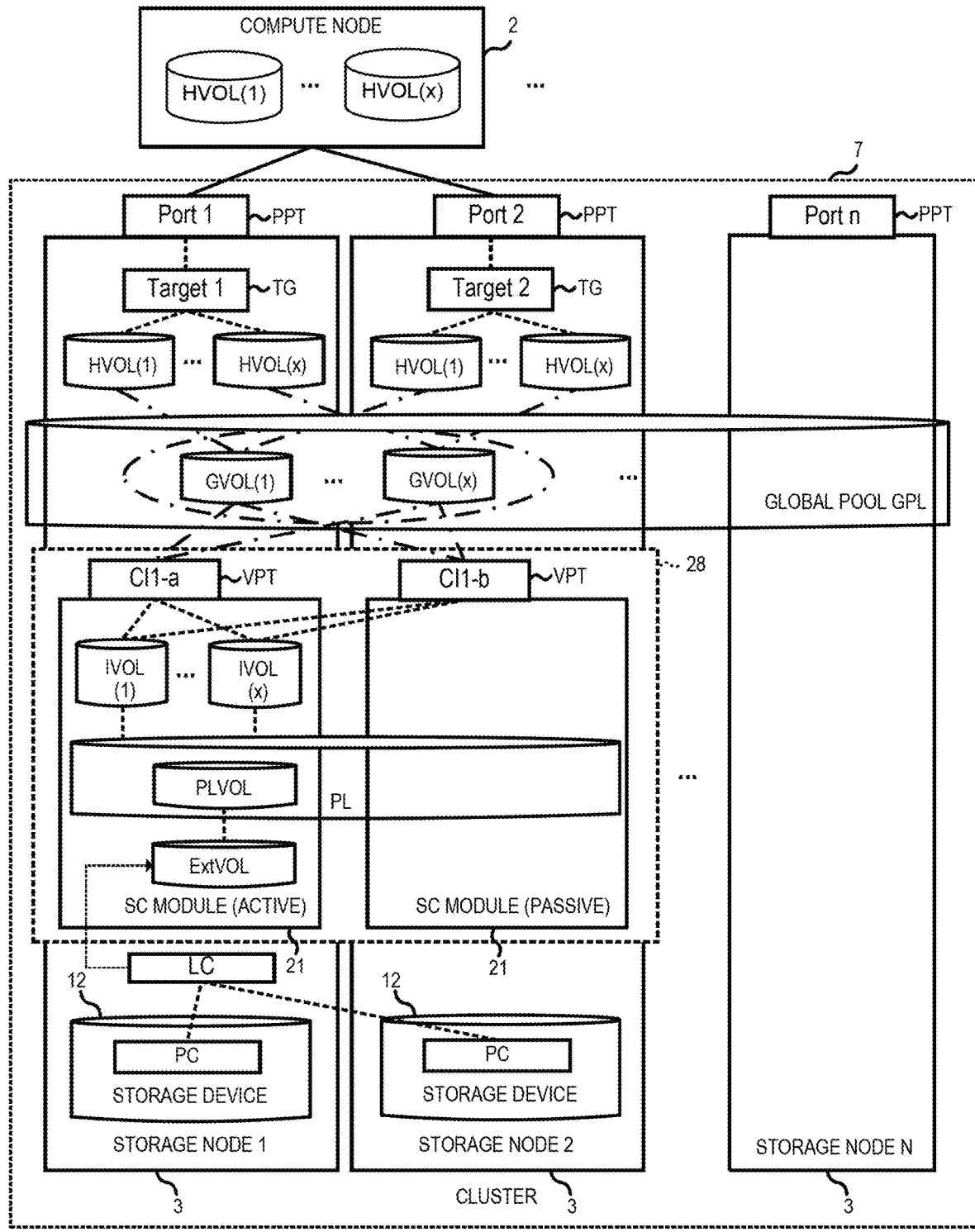
FIG. 4 is a block diagram for explaining a correspondence relationship among storage regions in the storage node.

FIG. 4 illustrates a correspondence relationship among storage regions in the information processing system 1 of the present embodiment. As illustrated in FIG. 4, in the present embodiment, a physical storage region provided by each of the storage devices 12 of each storage node 3 is divided into storage regions (hereinafter, referred to as physical chunks) PC each having a predetermined size and is managed by the capacity control module 22.

The capacity control module 22 correlates each of a plurality of physical chunks PC provided by each of the storage devices 12 of other storage nodes 3 with a logical storage region (hereinafter, referred to as a logical chunk) LC with the same size as that of the physical chunk PC, and correlates the logical chunk LC with a pool volume PLVOL with the same size as that of the logical chunk LC via an external volume ExtVOL.

The capacity control module 22 creates a pool PL by collecting a plurality of pool volumes PLVOL correlated with the logical chunk LC in the above-described way, and allocates the created pool PL to the storage control module pair 28 (FIG. 3) to which the active storage control module 21 disposed in its own node belongs. In the above-described way, the capacity control module 22 allocates the pool PL to each storage control module pair 28 as a dedicated storage region.

An internal volume IVOL which is one or a plurality of virtual logical volumes is created on the pool PL in response to an instruction given from the system manager via the management node 4. The internal volume IVOL is defined in the storage node 3 in which the active storage control module 21 of the two storage control modules 21 forming the storage control module pair 28 correlated with the pool PL is disposed.

Each internal volume IVOL is correlated with a global pool volume GVOL, on a one-to-one basis, which is a virtual logical volume defined in each storage node 3 in which the active storage control module 21 or the passive storage control module 21 is disposed, via a virtual port VPT defined in the active storage control module 21 forming the corresponding storage control module pair 28 (the storage control module pair 28 correlated with the internal volume IVOL via the pool PL) and a virtual port VPT defined in the passive storage control module 21 forming the storage control module pair 28.

All of the global pool volumes GVOL in the cluster 7 are collected, and are managed as a single pool (hereinafter, referred to as a global pool) GPL crossing all of the storage nodes 3 in the cluster 7.

Each global pool volume GVOL is correlated with a host volume HVOL, on a one-to-N basis, which is a virtual logical volume defined in each storage node 3 in which the active storage control module 21 or the passive storage control module 21 forming the storage control module pair 28 correlated with the global pool volume GVOL via the internal volume IVOL is disposed. The host volume HVOL is a volume provided to a compute node as a storage region for reading and writing data.

Each host volume HVOL is correlated with a physical port PPT of the storage node 3 on a one-to-one basis via a target TG defined in the storage node 3 in which the active storage control module 21 of the storage control module pair 28 corresponding to the internal volume IVOL correlated with the host volume HVOL via the global pool volume GVOL is disposed.

The global pool volume GVOL assigned with a unique identification number in the cluster 7 is created in response to a creation instruction given from the system manager via the management node 4. In this case, the internal volume IVOL correlated with the global pool volume GVOL on a one-to-one basis is created in correlation with the designated storage control module pair 28 along with the global pool volume GVOL.

When the system manager creates the target TG in the storage node 3 via the management node 4, the global pool volume GVOL is associated with the host volume HVOL correlated with the target TG by registering the target TG in the global pool volume GVOL.

The global pool volume GVOL is provided to prevent an identification number of the internal volume IVOL correlated with the host volume HVOL from being repeated in the cluster 7. Actually, in a case of the present embodiment, an IVOL number of the internal volume IVOL correlated with each storage control module pair 28 is unique in the storage node 3, but is not unique in the cluster 7. Thus, in the present embodiment, a correspondence relationship between the host volume HVOL and the internal volume IVOL can be uniquely specified by interposing the global pool volume GVOL having a unique GVOL number in the cluster 7 between the internal volume IVOL and the host volume HVOL.

On the other hand, a plurality of storage nodes 3 forming the cluster 7 are regarded as a single storage device when viewed from the compute node 2 side, and thus the host volume HVOL is recognized as a storage region provided to its own node from the storage device.

However, the host volume HVOL which can be recognized by each compute node 2 is only the host volume HVOL which is set for the compute node 2 by the system manager via the management node 4. Therefore, the compute node 2 recognizes the host volume HVOL set by the management node 4 as a storage region provided from the storage device.

Each compute node 2 manages a path to the target TG defined in any of the storage nodes 3 in the cluster 7 from a physical port (not illustrated) thereof. In a case where data is read/written from/into the desired host volume HVOL, the host computer 2 transmits an I/O request in which the host volume HVOL which is a read/write destination, a storage region which is a read/write destination in the host volume HVOL, and a data length of target data are designated, to the target TG recognized by the host computer.

In this case, in each storage node 3, the frontend module 20 (FIG. 3) manages a correspondence relationship among the host volume HVOL, the global pool volume GVOL, and the internal volume IVOL by using a frontend table volume table 31 which will be described later in FIG. 6, a mapping table 32 which will be described later in FIG. 7, and a global pool volume table 35 which will be described later in FIG. 10; the storage control module 21 manages a correspondence relationship from the internal volume IVOL to the logical chunk LC by using a management table (not illustrated); and the capacity control module 22 (FIG. 3) manages a correspondence relationship between the logical chunk LC and the physical chunk PC by using a management table (not illustrated).

In a case where an I/O request is received from the compute node 2, the frontend module 20 refers to the mapping table 32 and the global pool volume table 35, and specifies the storage node 3 in which the active storage control module 21 correlated via the host volume HVOL, the global pool volume GVOL, and the internal volume IVOL in this order designated in the I/O request is disposed.

In a case where the specified storage node 3 is its own node, the frontend module 20 rewrites a volume number of the host volume HVOL which is a read/write destination included in the I/O request into a volume number of the internal volume IVOL correlated with the host volume HVOL via the global pool volume GVOL, and then transmits the I/O request to the active storage control module 21 of its own node.

In a case where the specified storage node 3 is another storage node 3, the frontend module 20 transmits the I/O request to the specified storage node 3 via the backend network 6. Thus, the frontend module 20 of the storage node 3 to which the I/O request is transmitted rewrites a volume number of the host volume HVOL which is a read/write destination included in the I/O request into a volume number of the internal volume IVOL correlated with the host volume HVOL via the global pool volume GVOL, and then transmits the I/O request to the corresponding active storage control module 21 of its own node.

The active storage control module 21 having received the I/O request specifies the logical chunk LC correlated via the internal volume IVOL, a storage region in the internal volume IVOL, the pool PL, and the external volume ExtVOL in this order designated in the I/O request, and a storage region in the logical chunk LC, by using the above-described management table (not illustrated).

Thus, in the storage node 3, in a case where the I/O request is a write request, the backend module 23 writes data into corresponding storage regions of all of the physical chunks PC correlated with the logical chunk LC. In a case where the I/O request is a read request, the backend module 23 reads data from one physical chunk PC of the physical chunks PC correlated with the logical chunk LC, and transmits the data to the compute node 2 which is a transmission source of the read request.

In a case of the present embodiment, as described above, the data from the compute node 2 is made redundant and is stored in a plurality of physical chunks PC correlated with the corresponding logical chunk LC via the host volume HVOL, the global pool volume GVOL, and the internal volume IVOL in this order designated in an I/O request. Thus, the number of physical chunks PC respectively correlated with the logical chunks LC by the capacity control module 22 is determined depending on the set content of a redundancy method in the information processing system 1.

For example, in a case of setting in which data is duplicated and stored, two physical chunks PC are correlated with a single logical chunk LC, and, in a case of setting in which data is multiplexed of being triplicated or more, physical chunks PC of a necessary number of three or more are correlated with a single logical chunk LC.

In this case, if the physical chunk PC correlated with the logical chunk LC is selected from among the physical chunks PC in the storage node 3 which is different from the storage node 3 in which the active storage control module 21 is disposed, when the capacity control module 22 having received an I/O command from the active storage control module 21 reads/writes data from/into the physical chunk PC, communication with the storage node 3 providing the physical chunk PC is necessary, and thus response performance of the system deteriorates as a whole. Therefore, in a case where a plurality of physical chunks PC are correlated with the logical chunk LC, it is preferable that one of the physical chunks PC is selected from physical chunks PCs provided by the storage device 12 in the storage node 3 in which the active storage control module 21 is disposed from the viewpoint of response performance of the entire system.

When taking into consideration that the passive storage control module 21 is switched to an active mode in a case where a failure occurs in the storage node 3 in which the active storage control module 21 of the storage control module pair 28 is disposed, for the same reason, it is preferable that one of physical chunks PC correlated with the logical chunk LC is selected from physical chunks PC provided by the storage device 12 of the storage node 3 in which the passive storage control module 21 is disposed from the viewpoint of system performance of the entire system.

Therefore, in the information processing system 1, when the capacity control module 22 of each storage node 3 allocates the logical chunk LC to the storage control module pair 28, and correlates a plurality of physical chunks PC with the logical chunk LC, the capacity control module preferentially correlates the physical chunk PC provided by the storage device 12 of the storage node 3 in which the active storage control module 21 of the storage control module pair 28 is disposed and the physical chunk PC provided by the storage device 12 of the storage node 3 in which the passive storage control module 21 of the storage control module pair 28 is disposed, with the logical chunk LC.

(2) Configurations of Various Tables

FIGS. 5 to 10 illustrate configuration examples of various tables included in a database (not illustrated) held in the memory 11 of each storage node 3 in order to manage a configuration of each storage control module pair 28 or a correspondence relationship among the host volume HVOL, the global pool volume GVOL, and the internal volume IVOL described above.

Figure 7:
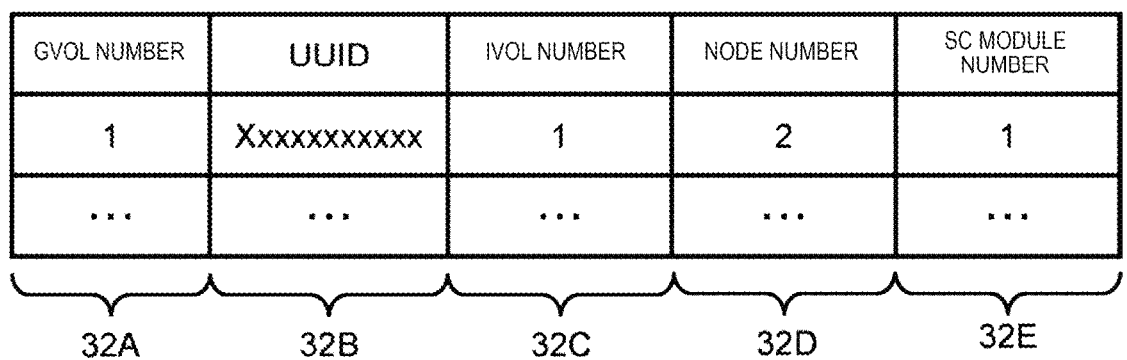
FIG. 7 is a diagram illustrating a configuration example of a mapping table.

Among the tables, the storage control module pair table 30 illustrated in FIG. 5, the frontend table volume table 31 illustrated in FIG. 6, the mapping table 32 illustrated in FIG. 7, a frontend target table 33 illustrated in FIG. 8, and the global pool volume 35 illustrated in FIG. 10 are managed by the frontend module 20. A storage control module configuration information table 34 illustrated in FIG. 9 is managed by the storage control module 21.

In a case where the storage control module pair table 30, the frontend table volume table 31, the mapping table 32, the frontend target table 33, and the global pool volume table 35 are updated in any storage node 3 in the cluster 7, the tables are similarly updated in all other storage nodes 3 in synchronization therewith, and are thus maintained in the same content among the respective storage nodes 3.

The storage control module pair table 30 is a table for the master cluster control module 25 (FIG. 4) to manage the storage control module pair 28 (FIG. 3) set in the cluster 7, and is configured to include a pair number field 30A, an active field 30B, and a passive field 30C as illustrated in FIG. 5. In the storage control module pair table 30, one row corresponds to one storage control module pair 28, and all storage control module pairs 28 in the cluster 7 are registered in the storage control module pair table 30.

An identification number (pair number) specific to the storage control module pair 28, assigned to the corresponding storage control module pair 28, is stored in the pair number field 30A.

The active field 30B is divided into a node number field 30BA and a storage control module field 30BB. An identification number (node number) of the storage node 3 in which the active storage control module 21 of two storage control modules 21 forming the corresponding storage control module pair 28 is disposed is stored in the node number field 30BA, and an identification number (storage control module number) of the active storage control module 21 is stored in the storage control module field 30BB.

Similarly, the passive field 30C is divided into a node number field 30CA and a storage control module number field 30CB. An identification number (node number) of the storage node 3 in which the passive storage control module 21 of two storage control modules 21 forming the corresponding storage control module pair 28 is disposed is stored in the node number field 30CA, and a storage control module number of the passive storage control module 21 is stored in the storage control module field 30CB.

Therefore, in a case of the example illustrated in FIG. 5, it is illustrated that the storage control module pair 28 assigned with the pair number of "1" is formed by the active storage control module 21 with the storage control module number of "0" disposed in the storage node 3 with the node number of "0" and the passive storage control module 21 with the storage control module number of "1" disposed in the storage node 3 with the node number of "1".

On the other hand, the frontend table volume table 31 is a table used to manage a correspondence relationship between the host volume HVOL and the internal volume IVOL. As illustrated in FIG. 6, the frontend table volume table 31 is configured to include a host volume ID field 31A, a UUID field 31B, a first node specifying information field 31C, a second node specifying information field 31D, an active side node specifying information field 31E, a storage control module number field 31F, a virtual port number field 31G, and an internal volume number field 31H. In the frontend table volume table 31, one row corresponds to one host volume HVOL, and all host volumes HVOL in the cluster 7 are registered.

A volume number specific to the host volume HVOL, assigned to the corresponding host volume HVOL, is stored in the volume number field 31A. The volume number is an identification number (volume number) of the host volume HVOL recognized by the compute node 2.

A universally unique identifier (UUID) specific to the host volume HVOL, assigned to the corresponding host volume HVOL in the cluster 7, is stored in the UUID field 31B, and a volume number of the internal volume IVOL correlated with the corresponding host volume HVOL is stored in the internal volume number field 31H.

Information (hereinafter, referred to as storage node specifying information) for specifying the storage node 3 in which the active storage control module 21 of the storage control module pair 28 correlated with the corresponding internal volume IVOL is disposed is stored in the first node specifying information field 31C, and storage node specifying information of the storage node 3 in which the passive storage control module 21 of the storage control module pair 28 is disposed is stored in the second node specifying information field 31D. In the present embodiment, as the storage node specifying information, an Internet protocol (IP) address of the corresponding storage node 3 on the storage service network 5 is used.

Of the two storage nodes 3, storage node specifying information of the storage node 3 in which the active storage control module 21 is disposed is stored in the active side node specifying information field 31E. A storage control module number of the active storage control module 21 is stored in the storage control module number field 31F, and, among virtual ports VPT defined in the active storage control module 21, an identification number (port number) of the virtual port VPT connected to the corresponding host volume HVOL and the corresponding internal volume IVOL is stored in the virtual port number field 31G.

Therefore, in a case of the example illustrated in FIG. 6, it is illustrated that the internal volume IVOL with the volume number of "1" is defined on the pool PL allocated to the storage control module pair 28 formed by the active storage control module 21 with the storage control module number of "1" disposed in the storage node 3 with the node specifying information of "sn1" and the passive storage control module 21 disposed in the storage node 3 with the node specifying information of "sn2", and the internal volume IVOL is correlated with the host volume HVOL with the volume number of "1" via the virtual port VPT with the port number of "C11-a" defined in the active storage control module 21. FIG. 6 also illustrates that a UUID of the host volume HVOL in the cluster 7 is "Xxxxxxxxxxx".

On the other hand, the mapping table 32 is a table used to manage a correspondence relationship between the global pool volume GVOL and the internal volume IVOL. As illustrated in FIG. 7, the mapping table 32 is configured to include a global pool volume number field 32A, a UUID field 32B, an internal volume number field 32C, a node number field 32D, and a storage control module number field 32E. In the mapping table 32, one row corresponds to one global pool volume GVOL, and all global pool volumes GVOL in the cluster 7 are registered.

A volume number of the corresponding global pool volume GVOL is stored in the global pool volume number field 32A, and a UUID of the global pool volume GVOL in the cluster 7 is stored in the UUID field 32B.

A volume number of the internal volume IVOL, assigned to the internal volume IVOL correlated with the global pool volume GVOL, is stored in the internal volume number field 32C. A node number of the storage node 3 (typically, the storage node 3 in which the corresponding active storage control module 21 is disposed) in which the internal volume IVOL is present is stored in the node number field 32D.

Of two storage control modules 21 forming the storage control module pair 28 (the storage control module pair 28 in which the internal volume IVOL is defined on the allocated pool PL) correlated with the internal volume IVOL, a storage control module number of the active storage control module 21 is stored in the storage control module number field 32E.

Therefore, in a case of the example illustrated in FIG. 7, it is illustrated that the global pool volume GVOL with the volume number of "1" is assigned with the UUID of "Xxxxxxxxxxx" in the cluster 7, and is correlated with the internal volume IVOL with the volume number of "1" defined in the storage node 3 with the node number of "2" in which the active storage control module 21 with the storage control module number of "1" is disposed.

The frontend target table 33 is a table used to manage a correspondence relationship between the target TG (FIG. 4) set for the physical port PPT (FIG. 4) of the storage node 3 on a one-to-one basis, and the host volume HVOL. As illustrated in FIG. 8, the frontend target table 33 is configured to include a target number field 33A, a target name field 33B, a UUID field 33C, a target IP field 33D, a host volume number list field 33E, and an initiator name field 33F. In the frontend target table 33, one row corresponds to one target TG, and all targets TG defined in the cluster 7 are registered.

An identification number (target number) specific to the target TG, assigned to the corresponding target TG, is stored in the target number field 33A, and a name (target name) assigned to the corresponding target TG is stored in the target name field 33B. The target name is a name assigned by a user or the management node 4.

A UUID of the target TG in the cluster 7, assigned to the corresponding target TG, is stored in the UUID field 33C. An IP address on the storage service network 5 of the physical port PPT in which the target TG is set is stored in the target IP field 33D.

Volume numbers of all host volumes HVOL correlated with the corresponding target TG are stored in the host volume number list field 33E, and a name (initiator name) of the compute node 2 which can login to the corresponding target TG is stored in the initiator name field 33F.

Therefore, in a case of the example illustrated in FIG. 8, it is illustrated that the target TG assigned with the target number of "1" and having the target name of "AAAA" is assigned with the UUID of "Xxxxxxxxxxxx" in the cluster 7; the IP address on the storage service network 5 of the physical port PPT in which the target TG is set is "xx.xx.xx.xx"; the target TG is correlated with a plurality of host volumes HVOL assigned with volume numbers of "1", "2", . . . and "N"; and the compute node 2 with the initiator name of "1qn.xxxx.xxx" is set to be able to login to the target TG.

The storage control module configuration information table 34 is a table used to manage a correspondence relationship between the virtual port VPT and the internal volume IVOL, and is configured to include a virtual port number field 34A and an internal volume number field 34B as illustrated in FIG. 9. The storage control module configuration information table 34 is created for each storage control module 21, and is managed by the corresponding storage control module 21.

A port number of the virtual port VPT defined in the corresponding storage control module 21 is stored in the virtual port number field 34A, and a volume number of the internal volume IVOL connected to the virtual port VPT is stored in the internal volume number field 34B.

Therefore, in a case of the example illustrated in FIG. 9, the virtual port VPT of "C11-a" of the corresponding storage control module 21 is connected to the internal volume IVOL with the volume number of "1".

The global pool volume table 35 is a table used to manage the global pool volume GVOL defined in the cluster 7, and is configured to include a global pool volume number field 35A, a target number field 35B, and a host volume number field 35C as illustrated in FIG. 10. In the global pool volume table 35, one row corresponds to one global pool volume GVOL, and all global pool volumes GVOL defined in the cluster 7 are registered.

An identification number (volume number) specific to the global pool volume GVOL, assigned to the corresponding global pool volume GVOL, is stored in the global pool volume number field 35A, and volume numbers of all host volumes HVOL correlated with the corresponding global pool volume GVOL are stored in the host volume number field 35C. A target number of the target TG correlated with the corresponding host volume HVOL is stored in the target number field 35B.

Therefore, in a case of FIG. 10, it is illustrated that the global target volume GVOL assigned with the volume number of "1" is correlated with at least the host volume HVOL assigned with the volume number of "1", and the host volume HVOL is correlated with the target TG assigned with the target number of "1" and the target TG assigned with the target number of "2" (refer to FIG. 4).

Figure 11:
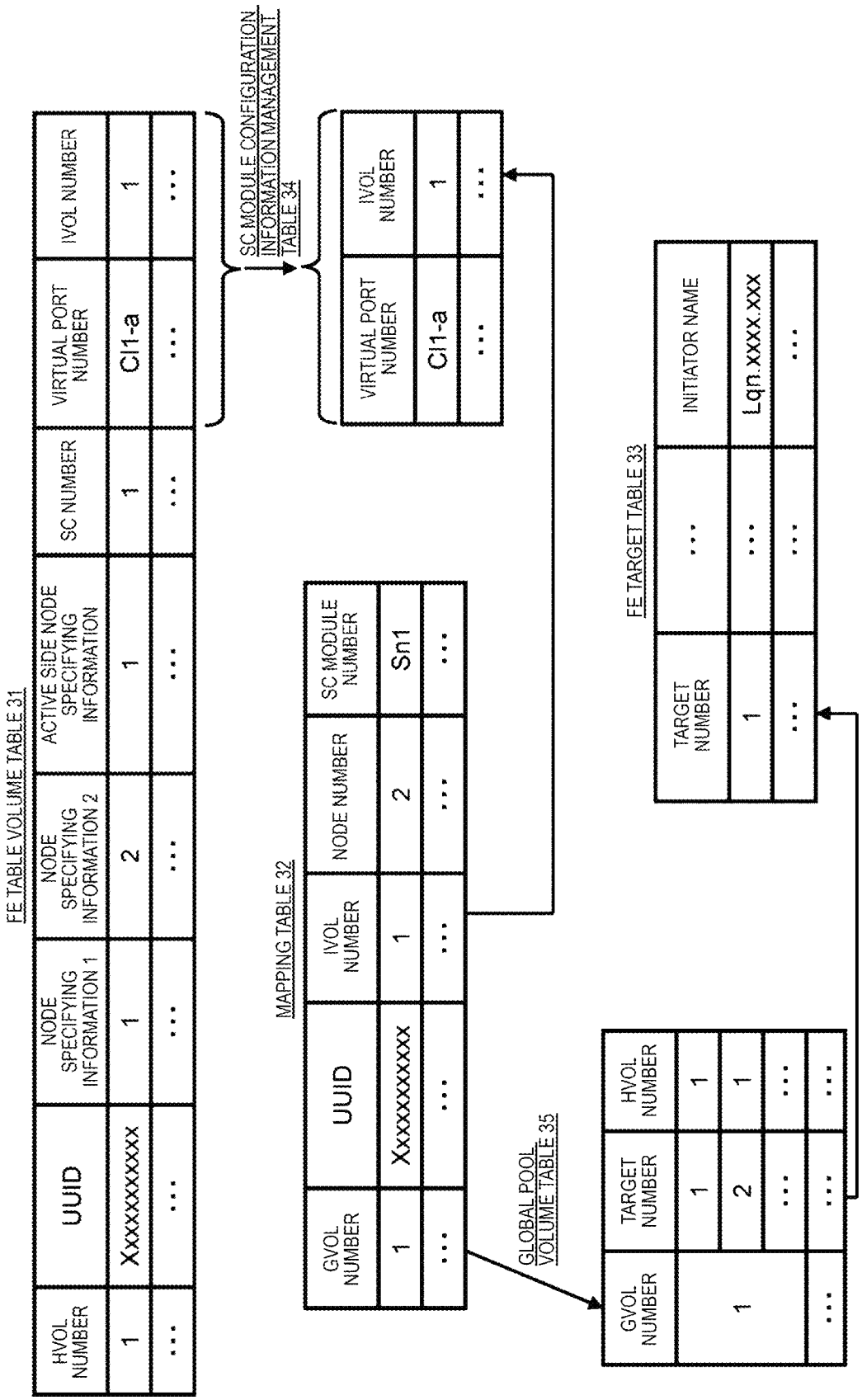
FIG. 11 is a conceptual diagram for explaining a correspondence relationship of information among the respective tables.

FIG. 11 illustrates a correspondence relationship of information among the frontend table volume table 31, the mapping table 32, the frontend target table 33, the storage control module configuration information table 34, and the global pool volume 35.

As illustrated in FIG. 11, the virtual port number and the volume number respectively stored in the virtual port number field 31G (FIG. 6) and the internal volume number field 31H (FIG. 6) of the frontend table volume table 31 respectively correspond to the virtual port number and the volume number respectively stored in the virtual port number field 34A (FIG. 9) and the internal volume number field 34B (FIG. 9) of the storage control module configuration information management table 34 managed by the storage control module 21 having the virtual port VPT (FIG. 4) assigned with the virtual port number.

Therefore, a correspondence relationship between the rows can be recognized with a combination of the port number of the virtual port VPT and the volume number of the internal volume IVOL correlated with the virtual port VPT as a key between the frontend table volume table 31 and the storage control module configuration information management table 34.

The volume number stored in the global pool volume number field 32A (FIG. 7) of the mapping table 32 corresponds to the volume number stored in the global pool volume number field 35A of the global pool volume table 35. Therefore, a correspondence relationship between the rows can be recognized with the volume number of the global pool volume GVOL as a key between the mapping table 32 and the global pool volume table 35.

The volume number stored in the internal volume number field 32C (FIG. 7) of the mapping table 32 corresponds to the volume number stored in the internal volume number field 34B (FIG. 9) of the storage control module configuration information management table 34 managed by the active storage control module 21 providing the internal volume IVOL (FIG. 4) with the internal volume number. Therefore, a correspondence relationship between the rows can be recognized with the volume number of the internal volume IVOL as a key between the mapping table 32 and the storage control module configuration information management table 34.

The target number stored in the target number field 35B (FIG. 10) of the global pool volume table 35 corresponds to the target number stored in the target number field 33A of the frontend target table 33 (FIG. 8). Therefore, a correspondence relationship between the rows can be recognized with the target number as a key between the global pool volume table 35 and the frontend target table 33.

(3) Flow of Internal Volume Creation

Figure 12:
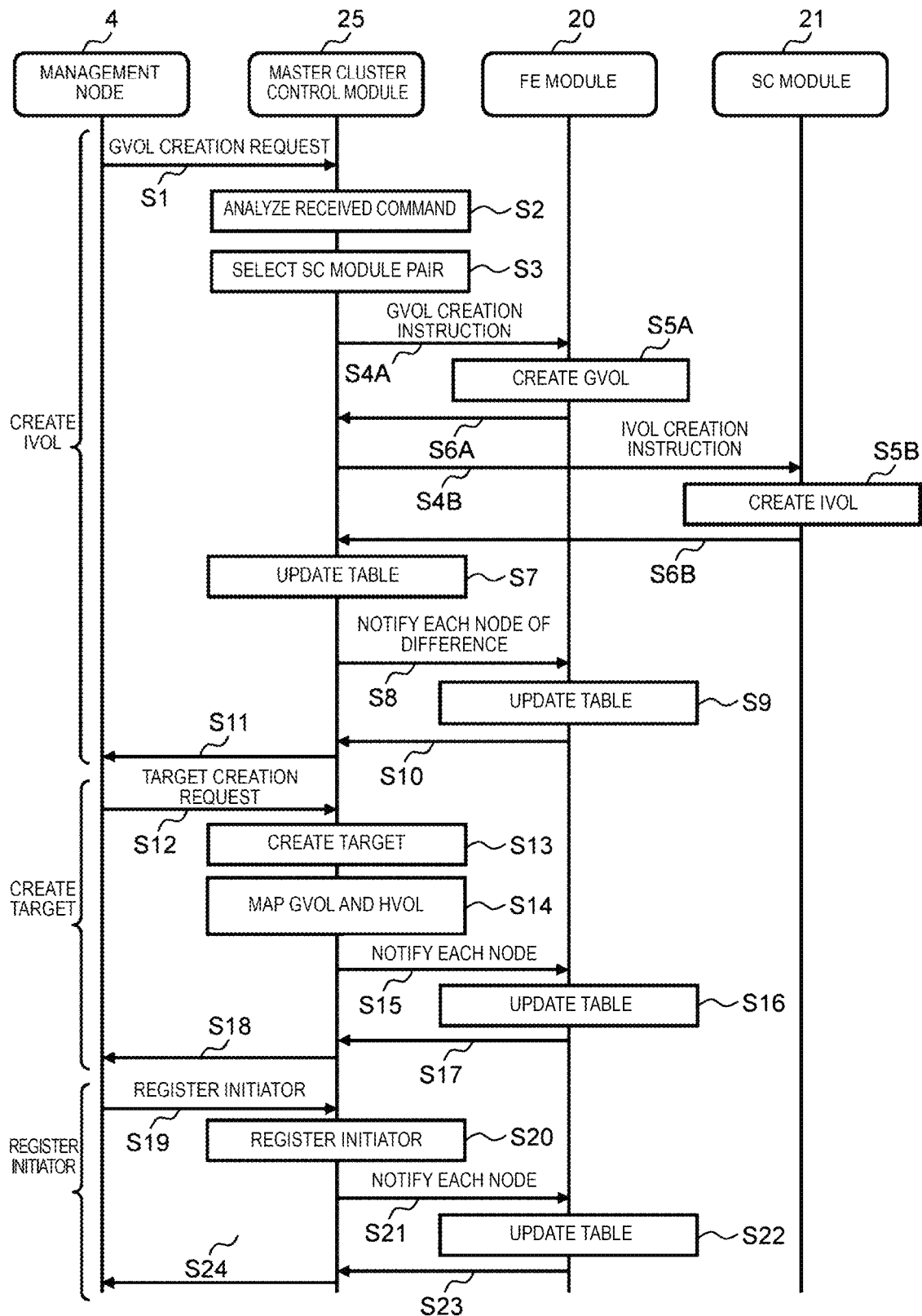
FIG. 12 is a sequence diagram illustrating a flow of processes during internal volume creation.

Next, with reference to FIG. 12, a description will be made of a flow of a series of processes in which the internal volume IVOL described in FIG. 4 is created in the cluster 7 so as to be correlated with the host volume HVOL, and various settings regarding the internal volume IVOL are performed.

In the information processing system 1, in a case where a new host volume HVOL provided to the compute node 2 is created, the system manager operates the management node 4 to transmit a creation request for the global pool volume GVOL (hereinafter, referred to as a global pool volume creation request) correlated with the host volume HVOL to be created at that time, to the storage node 3 in which the master cluster control module 25 is disposed (S1).

First, the master cluster control module 25 having received the global pool volume creation request analyzes the received command (global pool volume creation request) (S2), and selects the storage control module pair 28 (FIG. 3) which is the optimum to be correlated with the global pool volume GVOL to be created at that time in a case where the command is recognized as the global pool volume creation request (S3). For example, the master cluster control module 25 selects the storage control module pair 28 including the active storage control module 21 disposed in the storage node 3 with the lowest load in step S3.

The master cluster control module 25 transmits an instruction for creating the global pool volume GVOL (hereinafter, referred to as a global pool volume creation instruction) and an instruction for creating the internal volume IVOL (hereinafter, referred to as an internal volume creation instruction) to the storage node 3 in which the active storage control module 21 is disposed of the storage control modules 21 forming the storage control module pair 28 selected in step S3 via the backend network 6 (S4A and S4B).

Thus, the frontend module 20 of the storage node 3 having received the global pool volume creation instruction creates the global pool volume GVOL in its own node (S5A). The active storage control module 21 of the storage node 3 creates the internal volume IVOL in its own node in correlation with the pool PL (FIG. 4) allocated to the storage control module pair 28 formed by the storage control module 21 and the global pool volume GVOL created in step S5A in response to the internal volume creation instruction (S5B).

The global pool volume GVOL and the internal volume IVOL are virtual logical volumes without entities, and thus creation of the global pool volume GVOL or the internal volume IVOL is performed by registering information regarding the volumes in the global pool volume table 35 (FIG. 10) or the corresponding storage control module configuration information table 34 (FIG. 9).

Actually, the frontend module 20 adds a new row to the global pool volume table 35 (FIG. 10) managed thereby, and stores a volume number assigned to the global pool volume GVOL in the global pool volume number field 35A (FIG. 10) of the row.

Next, the frontend module 20 notifies the master cluster control module 25 of the volume number of the global pool volume GVOL created as mentioned above and a volume number of the internal volume IVOL correlated with the global pool volume GVOL via the backend network 6 (S6A).

The active storage control module 21 adds a new row to the storage control module configuration information table 34 (FIG. 9) managed thereby, stores a volume number of the internal volume IVOL to be created at that time in the internal volume number field 34B (FIG. 9) of the row, and also stores a port number of the virtual port VPT (FIG. 4) of the storage control module 21 of its own node correlated with the internal volume IVOL in the virtual port number field 34A (FIG. 9) of the row.

Next, the active storage control module 21 sends a completion notification including the volume number of the internal volume IVOL created as mentioned above and the port number of the virtual port VPT correlated with the internal volume IVOL to the master cluster control module 25 via the backend network 6 (S6B).

On the other hand, the master cluster control module 25 having received the completion notification instructs the frontend module 20 of its own node to register the global pool volume GVOL or the internal volume IVOL in the frontend table volume table 31 (FIG. 6), the mapping table 32 (FIG. 7), and the global pool volume table 35 (FIG. 10) of its own node. Thus, the frontend module 20 having received the instruction registers the global pool volume GVOL or the internal volume IVOL in the frontend table volume table 31, the mapping table 32, and the global pool volume table 35 (FIG. 10) stored in the memory 11 (FIG. 2) of its own node (S7).

Specifically, the frontend module 20 adds a new row to the frontend table volume table 31 stored in the memory 11 (FIG. 2) of its own node, and stores the storage node specifying information of the storage node 3 in which one storage control module 21 forming the storage control module pair 28 selected in step S3 is disposed, in the first node specifying information field 31C (FIG. 6) of the row. The frontend module 20 stores the storage node specifying information of the storage node 3 in which the other storage control module 21 forming the storage control module pair 28 selected in step S3 is disposed, in the second node specifying information field 31D (FIG. 6) of the row.

The frontend module 20 stores the storage node specifying information of the storage node 3 in which the active storage control module 21 of the two storage control modules 21 forming the storage control module pair 28 is disposed, in the active side node specifying information field 31E (FIG. 6) of the row, and also stores the storage control module number of the active storage control module 21 in the storage control module number field 31F (FIG. 6) of the row.

The frontend module 20 stores the port number of the virtual port VPT included in the completion notification transmitted from the corresponding storage control module 21, received in step S7, in the virtual port number field 31G (FIG. 6) of the row, and also stores the volume number of the internal volume included in the completion notification in the internal volume number field 31H (FIG. 6) of the row.

Similarly, the frontend module 20 adds a new row to the mapping table 32 (FIG. 7), stores the volume number and the UUID of the global pool volume GVOL created at that time in the global pool volume number field 32A (FIG. 7) and the UUID field 32B (FIG. 7) of the row, respectively, and also stores the volume number of the internal volume IVOL correlated with the global pool volume GVOL in the internal volume number field 32C (FIG. 7) of the row.

The frontend module 20 stores the node number of the storage node 3 in which the active storage control module 21 of the storage control module pair 28 selected in step S3 is disposed in the node number field 32D (FIG. 7) of the row, and also stores the storage control module number of the active storage control module 21 in the storage control module number field 32E (FIG. 7) of the row.

The frontend module 20 adds a new row to the global pool volume table 35 (FIG. 10), and stores the volume number of the global pool volume GVOL created at that time in the global pool volume number field 35A (FIG. 10) of the row.

In a case where the frontend module 20 of its own node has registered the global pool volume GVOL or the internal volume IVOL in the frontend table volume table 31, the mapping table 32, and the global pool volume table 35 of its own node in the above-described way, the master cluster control module 25 transmits respective differences in the frontend table volume table 31, the mapping table 32, and the global pool volume table 35 before and after being updated, to the respective storage nodes 3 other than its own node in the cluster 7 as difference data via the backend network 6 (S8).

Thus, the frontend module 20 of each storage node 3 having received the difference data updates the frontend table volume table 31, the mapping table 32, and the global pool volume table 35 of its own node on the basis of the difference data in the same manner as in the frontend table volume table 31, the mapping table 32, and the global pool volume table 35 of the storage node 3 in which the master cluster control module 25 is disposed (S9). In the above-described way, the frontend table volume tables 31, the mapping tables 32, and the global pool volume tables 35 of the respective storage nodes 3 are updated in synchronization with each other, and thus the content of the frontend table volume table 31, the mapping table 32, and the global pool volume table 35 is maintained in the same state among the respective storage nodes 3 in the cluster 7 at all times.

In a case where the frontend table volume table 31, the mapping table 32, and the global pool volume table 35 of its own node have been updated in the above-described way, the frontend module 20 transmits an update completion notification to the master cluster control module 25 via the backend network 6 (S10).

In a case where the completion notifications in step S10 are received from the frontend modules 20 of all storage nodes 3 other than its own node in the cluster 7, the master cluster control module 25 transmits a completion notification indicating that the requested global pool volume GVOL has been created, to the management node 4 (S11).

On the other hand, in a case where the completion notification in step S11 is transmitted from the master cluster control module 25, the management node 4 transmits a request (hereinafter, referred to as a target creation request) for creating the target TG (FIG. 4) correlated with the host volume HVOL to be created at that time, to the master cluster control module 25 via the storage service network 5 (S12). The target creation request includes a target name of the target TG to be created at that time, a volume number of the host volume HVOL correlated with the target TG, and an IP address of the target TG.

In a case where the target creation request is received, the master cluster control module 25 instructs the frontend module 20 of its own node to create the requested targets TG in two storage nodes 3 in which the respective storage control modules 21 forming the storage control module pair 28 selected in step S3 are disposed (S13). However, the targets TG are virtual and thus do not have entities, and thus creation of the targets TG is performed by registering new information regarding the targets TG in the frontend target table 33 (FIG. 8).

Actually, the frontend module 20 having received the instruction from the master cluster control module 25 adds two new rows to the frontend target table 33 (FIG. 8) stored in the memory 11 of its own node, and stores information corresponding to target names of the new targets TG, network IPs, and volume numbers of the host volumes HVOL designated in the target creation request given from the management node 4 in step S12, in the target name field 33B (FIG. 8), the target IP field 33D (FIG. 8), and the host volume number field 33E (FIG. 8) of the rows, respectively. The frontend module 20 stores unique UUIDs in the cluster 7, assigned to the corresponding targets TG, in the UUID field 33C (FIG. 8) of the rows.

Next, the master cluster control module 25 instructs the frontend module 20 of its own node to map the global pool volume GVOL created in step S5A, the internal volume IVOL created in step S5B, and the host volume HVOL to be created at that time onto each other (S14).

Thus, the frontend module 20 having received the instruction stores a volume number of the host volume HVOL to be created at that time designated in the target creation request, in the volume number field 31A (FIG. 6) of the new row added to the frontend table volume table 31 (FIG. 6) of its own node in step S7. The frontend module 20 assigns a unique UUID in the cluster 7 to the host volume HVOL, and stores the assigned UUID in the UUID field 31B (FIG. 6) of the row.

The frontend module 20 stores the target number of each target TG created at that time designated in the target creation request in the target number field 35B of the new row added to the global pool volume table 35 (FIG. 10) of its own node in step S7 in the same manner as described above, and also stores a volume number of the host volume HVOL to be created at that time in each host volume number field 35C of the row.

In a case where creation of the requested target TG, and mapping among the global pool volume GVOL created in step S5A, the internal volume IVOL created in step S6B, and the host volume HVOL to be created at that time are completed in the above-described way, the master cluster control module 25 transmits a difference in the frontend target table 33 updated in step S13 before and after being updated, and respective differences in the frontend table volume table 31 and the global pool volume table 35 updated in step S14 before and after being updated, to the respective storage nodes 3 other than its own node in the cluster 7 as difference data via the backend network 6 (S15).

Thus, the frontend module 20 of each storage node 3 having received the difference data updates the frontend target table 33, the frontend table volume table 31, and the global pool volume table 35 of its own node on the basis of the difference data in the same manner as in the frontend target table 33, the frontend table volume table 31, and the global pool volume table 35 of the storage node 3 in which the master cluster control module 25 is disposed (S16).

In a case where the frontend target table 33, the frontend table volume table 31, and the global pool volume table 35 of its own node have been updated in the above-described way, the frontend module 20 transmits an update completion notification to the master cluster control module 25 via the backend network 6 (S17).

In a case where the completion notifications in step S17 are received from the frontend modules 20 of all storage nodes 3 other than its own node in the cluster 7, the master cluster control module 25 transmits a completion notification indicating that the requested target TG has been created, to the management node 4 (S18).

On the other hand, in a case where the completion notification in step S18 is transmitted from the master cluster control module 25, the management node 4 transmits an initiator registration request for correlating the target TG created through the processes in steps S12 to S18 with the compute node 2 (initiator) which is permitted to access the host volume HVOL correlated with the target TG, to the master cluster control module 25 (S19). The initiator registration request includes a node name of the compute node 2 and the target name of the target TG.

In a case where the initiator registration request is received, the master cluster control module 25 gives an instruction to the frontend module 20 of its own node such that the compute node 2 designated in the initiator registration request is registered as an initiator which can access the target TG created in step S13. Thus, the frontend module 20 having received the instruction registers the compute node 2 as an initiator which can access the target TG (S20). Specifically, the frontend module 20 stores the node name of the compute node 2 designated in the initiator registration request in the initiator name field 33F (FIG. 8) of the frontend target table 33 stored in the memory 11 (FIG. 2) of its own node.

In a case where the compute node 2 has been registered as an initiator which can access the target TG in the above-described way, the master cluster module 25 transmits a difference in the frontend target table 33 before and after being updated to the respective storage nodes 3 other than its own node in the cluster 7 as difference data via the backend network 6 (S21).

Thus, the frontend module 20 of each storage node 3 having received the difference data updates the frontend target table 33 of its own node on the basis of the difference data in the same manner as in the frontend target table 33 of the storage node 3 in which the master cluster control module 25 is disposed (S22).

In a case where the frontend target table 33 of its own node has been updated in the above-described way, the frontend module 20 transmits an update completion notification to the master cluster control module 25 via the backend network 6 (S23).

In a case where the completion notifications in step S23 are received from the frontend modules 20 of all storage nodes 3 other than its own node in the cluster 7, the master cluster control module 25 transmits a completion notification indicating that the requested initiator has been registered, to the management node 4 (S24). As mentioned above, the series of processes is completed.

(4) Flow of Processes During Occurrence of Failure in Storage Node or Addition of Storage Node Next, a description will be made of a flow of processes in the information processing system 1 in a case where a failure occurs in any one of the storage nodes 3 forming the cluster 7, or the storage node 3 is added to the cluster 7.

(4-1) Flow of Processes During Occurrence of Failure in Storage Node

Figure 13:
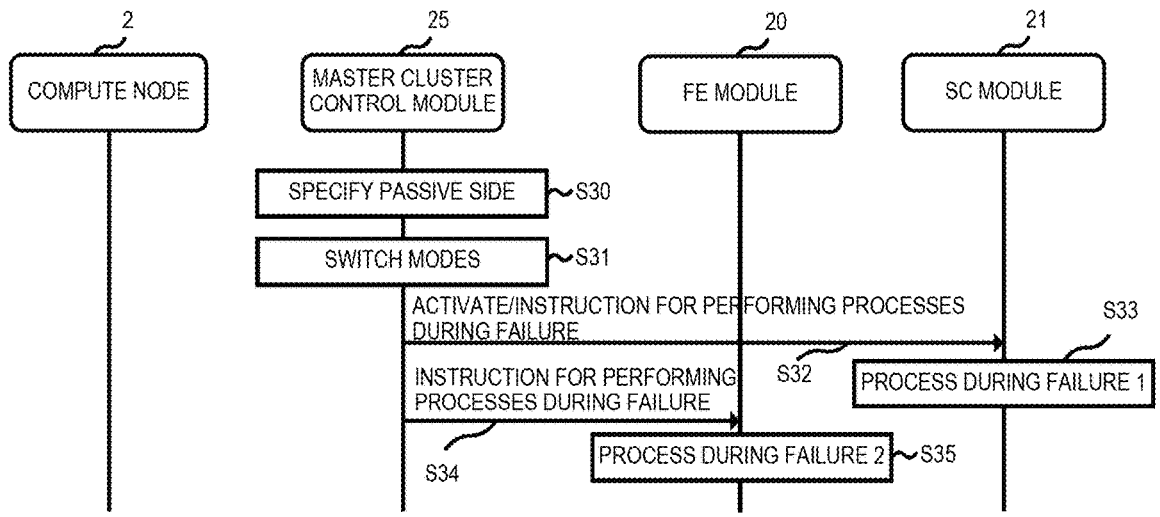
FIG. 13 is a sequence diagram illustrating a flow of a series of processes performed in a cluster in a case where a failure occurs in a storage node in the cluster.

FIG. 13 illustrates a flow of a series of processes performed in the cluster 7 in a case where a failure occurs in any one of the storage nodes 3 forming the cluster 7.

In a case of the present embodiment, the master cluster control module 25 performs periodic health check on each storage node 3. In a case where it is detected that a failure occurs in any storage node 3 during the health check, the master cluster control module 25 specifies the other storage control module (passive storage control module) 21 forming the same storage control module pair 28 along with the active storage control module 21 disposed in the storage node (hereinafter, referred to as a failure storage node) 3 in which the failure occurs (S30).

Specifically, the master cluster control module 25 refers to the storage control module pair table 30 (FIG. 5), specifies a row of which a node number of the failure storage node 3 is stored in the node number field 30BA (FIG. 5) of the active field 30B (FIG. 5) among the respective rows of the storage control module pair table 30, and acquires a storage control module number stored in the storage control module number field 30CB (FIG. 5) of the passive field 30C (FIG. 5) and a node number stored in the node number field 30CA (FIG. 5) of the passive field 30C of the row.

Next, the master cluster control module 25 switches a state of the storage control module 21 specified in step S30 to an active mode (S31). Specifically, the master cluster control module 25 stores respective numbers corresponding to the node number and the storage control module number acquired in step S30 in the node number field 30BA (FIG. 5) and the storage control module number field 30BB (FIG. 5) of the active field 30B (FIG. 5) of the row specified in step S30 among the rows of the storage control module pair table 30. The master cluster control module 25 transmits difference data regarding a difference in the storage control module pair table 30 before and after being updated, updated in the above-described way, to the respective storage nodes 3 other than its own node in the cluster 7, so as to update the storage control module pair tables 30 of the storage nodes 3 in the same manner.

The master cluster control module 25 activates the storage control module 21 assigned with the storage control module number acquired in the above-described way of the storage node 3 assigned with the node number acquired in step S30 (S32), and causes the storage control module 21 to perform a necessary process during the failure (S33).

On the other hand, the master cluster control module 25 also transmits the same instruction for performing a process during the failure as the instruction for performing a process during the failure in step S31 to the frontend module 20 installed in the storage node 3 with the node number specified in step S30 via the backend network 6 (S34).

The frontend module 20 having received the instruction for performing a process during the failure performs a process during the failure for switching a correspondence destination of the internal volume IVOL correlated with the storage control module 21 switched to the active mode in step S32 to the storage control module 21 switched to the active mode in step S32 (S35).

Specifically, first, the frontend module 20 specifies a row of which a storage control module number of the active storage control module 21 forming the storage control module pair 28 along with the storage control module 21 until then is stored in the storage control module number field 31F (FIG. 6) of the frontend table volume table 31 of its own node.

The frontend module 20 updates node specifying information stored in the active side node specifying information field 31E (FIG. 6) of the row to node specifying information of its own node, and updates the storage control module number stored in the storage control module number field 31F of the row to the storage control module number of the storage control module 21 switched to the active mode in step S31. The frontend module 20 updates a port number stored in the virtual port number field 31G (FIG. 6) of the row to a port number of the virtual port VPT which is the virtual port VPT (FIG. 4) of the storage control module 21 switched to the active mode in step S31 and is correlated with the corresponding host volume HVOL.

First, the frontend module 20 specifies a row of which the storage control module number of the active storage control module 21 forming the storage control module pair 28 along with the storage control module 21 of its own node until then is stored in the storage control module number field 32E (FIG. 7) of the mapping table 32 (FIG. 7) of its own node. The frontend module 20 rewrites a node number stored in the node number field 32D (FIG. 7) of the row into the node number of its own node. The frontend module 20 rewrites a storage control module number stored in the storage control module number field 32E of the row into the storage control module number of the storage control module 21 switched to the active mode in step S31.

The frontend module 20 specifies a row of which a volume number of the host volume HVOL correlated with the corresponding internal volume IVOL defined in the failure storage node 3 is stored in the host volume number list field 33E of the frontend target table 33 (FIG. 8). The frontend module 20 rewrites an IP address stored in the target ID field 33D of the row into an IP address of the physical port PPT which is the physical port PPT (FIG. 4) of its own node and is correlated with the host volume HVOL.

The master cluster control module 25 transmits difference data regarding differences in the frontend table volume table 31, the mapping table 32, and the frontend target table 33 before and after being updated, updated in the above-described way, to the frontend modules 20 of the respective storage nodes 3 other than its own node in the cluster 7, so as to update the frontend table volume tables 31, the mapping tables 32, and the frontend target tables 33 of the storage nodes 3 in the same manner.

Although not illustrated in FIG. 13, the master cluster control module 25 selects the storage control module 21 which has to form the new storage control module pair 28 along with the storage control module 21 switched to the active mode in step S32, instead of the active storage control module 21 disposed in the failure storage node 3, in addition to the processes in steps S31 and S32.

Such a storage control module 21 is selected from among the storage control modules 21 disposed in the storage nodes 3 other than the storage node 3 in which the storage control module 21 switched to the active mode in step S32 is disposed, the storage control modules 21 (the storage control modules 21 not forming the storage control module pairs 28 along with any storage control module 21) being disposed in any storage nodes 3 other than the failure storage node 3 in the cluster 7 and not being used at that time.

The master cluster control module 25 updates the storage control module pair table 30 (FIG. 5) and the frontend table volume table 31 (FIG. 6) in order to set the storage control module 21 selected in the above-described way and the storage control module 21 switched to the active mode in step S32 as a new storage control module pair 28.

Specifically, the master cluster control module 25 specifies a row of which the node number and the storage control module number acquired in step S30 are stored in the node number field 30BA (FIG. 5) and the storage control module number field 30BB (FIG. 5) of the active field 30B (FIG. 5) of the storage control module pair table 30, rewrites the storage control module number stored in the storage control module number field 30CB (FIG. 5) of the passive field 30C (FIG. 5) of the row into a storage control module number of the storage control module 21 selected in the above-described way, and also rewrites the node number stored in the node number field 30CA (FIG. 5) of the passive field 30C into a node number of the storage node 3 in which the storage control module 21 is disposed.

The master cluster control module 25 rewrites the node number of the failure storage node 3 stored in either of the first and second node specifying information fields 31C and 31D of the corresponding row in the frontend table volume table 31 into the node number of the storage node 3 in which the storage control module 21 selected in the above-described way is disposed via the frontend module 20 of its own node.

The master cluster control module 25 transmits difference data regarding differences in the storage control module pair table 30 and the frontend table volume table 31 before and after being updated, updated in the above-described way, to the respective storage nodes 3 other than its own node in the cluster 7, so as to update the storage control module pair tables 30 and the frontend table volume tables 31 of the storage nodes 3 in the same manner.

(4-2) Flow of Processes During Addition of Storage Node

Figure 14:
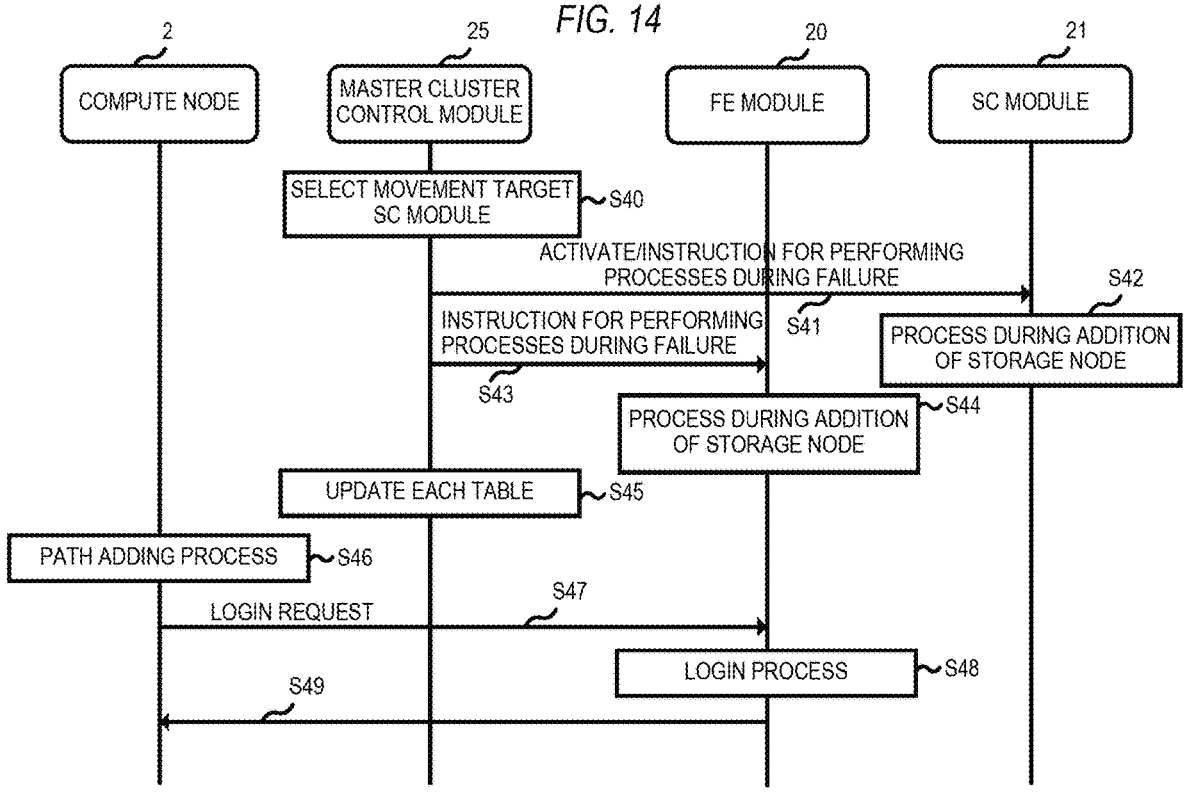
FIG. 14 is a sequence diagram illustrating a flow of a series of processes performed in a cluster in a case where a storage node is added to the cluster.

FIG. 14 illustrates a flow of a series of processes performed in the cluster 7 in a case where the storage node 3 is added to the cluster 7.

In a case where the storage node 3 is added to the cluster 7, the system manager notifies the master cluster control module 25 of this fact via the management node 4. The master cluster control module 25 having received the notification selects the storage control module (hereinafter, referred to as a movement target storage control module) 21 to be moved to the added storage node 3 in order to distribute loads to the storage nodes 3 (S40).

For example, the master cluster control module 25 selects the active storage control module 21 disposed in the storage node 3 having the highest load as the movement target storage control module 21 from among the storage control modules 21 in the cluster 7.

Next, the master cluster control module 25 performs processes for replacing any one of storage control modules 21 disposed in the added storage node 3 and not used at that time with the movement target storage control module 21 selected in step S40 (S41 to S45).

Specifically, first, the master cluster control module 25 activates the storage control module (hereinafter, referred to as a selected storage control module) 21 of the added storage node 3 selected in step S40 (S41), and causes the selected storage control module 21 to perform a predetermined process during addition for taking over a process which is being performed until then to the movement target storage control module 21 (S42).

The master cluster control module 25 causes the movement target storage control module 21 to perform a predetermined process during addition for taking over a process which is being performed until then by the movement target storage control module 21 to the selected storage control module 21 (S41 and S42). The process during addition includes a process of transmitting data of each of the storage control module pair table 30 (FIG. 5), the frontend table volume table 31 (FIG. 6), the mapping table 32 (FIG. 7), the frontend target table 33 (FIG. 8), and the global pool volume table 35 (FIG. 10) to the frontend module 20 of the added storage node 3.

Next, the master cluster control module 25 instructs the frontend module 20 of its own node to switch a correspondence destination of the internal volume IVOL correlated with the movement target storage control module 21 to the selected storage control module 21 and also to set an environment of the selected storage control module 21 in the added storage node 3 to be the same as an environment of the movement target storage control module 21 in the storage node 3 in which the movement target storage control module 21 is disposed (S43).

Thus, the frontend module 20 having received the instruction updates the storage control module pair table 30 (FIG. 5), the frontend table volume table 31 (FIG. 6), the mapping table 32 (FIG. 7), the frontend target table 33 (FIG. 8), and the global pool volume table 35 (FIG. 10) stored in the memory 11 (FIG. 2) of its own node in response to the instruction as necessary (S44).

Specifically, first, the frontend module 20 specifies a row of which a storage control module number of the movement target storage control module 21 is stored in the storage control module number field 30BB (FIG. 5) of the active field 30B (FIG. 5) of the storage control module pair table 30. The frontend module 20 rewrites a node number stored in the node number field 30BA (FIG. 5) of the active field 30B of the row into a node number of the added storage node 3, and also rewrites the storage control module number stored in the storage control module number field 30BB (FIG. 5) of the active field 30B into a storage control module number of the selected storage control module 21.

The frontend module 20 first specifies a row of which the storage control module number of the movement target storage control module 21 is stored in the storage control module number field 31F (FIG. 6) of the frontend table volume table 31.

The frontend module 20 rewrites node specifying information of the storage node 3 in which the movement target storage control module 21 is disposed, stored in either of the first and second node specifying information fields 31C and 31D (FIG. 6), and node specifying information of the storage node 3 stored in the active side node specifying information field 31E (FIG. 6), into node specifying information of the added storage node 3.

The frontend module 20 rewrites the storage control module number stored in the storage control module number field 31F of the row into a storage control module number of the selected storage control module 21. The frontend module 20 rewrites a virtual port number stored in the virtual port number field 31G (FIG. 6) of the row into a virtual port number of the virtual port VPT (FIG. 4) which is defined in the selected storage control module 21 so as to correspond to the corresponding host volume HVOL correlated until then by the movement target storage control module 21.

First, the frontend module 20 specifies a row of which the storage control module number of the movement target storage control module 21 is stored in the storage control module number field 32E (FIG. 7) of the mapping table 32. The frontend module 20 rewrites the storage control module number stored in the storage control module number field 32E of the row into the selected storage control module number. The frontend module 20 rewrites a node number stored in the node number field 32D (FIG. 7) of the row into the node number of the added storage node 3.

First, the frontend module 20 specifies a row of which a volume number of the corresponding host volume HVOL is stored in the host volume number list field 33E (FIG. 8) of the frontend target table 33. The volume number may be acquired as, for example, a volume number stored in the host volume number field 31A of the row in the above-described way in the frontend table volume table 31.

The frontend module 20 rewrites an IP address stored in the target IP field of the row into an IP address on the storage service network 5 (FIG. 1) of the physical port PPT (FIG. 4) correlated with the corresponding host volume HVOL in the added storage node 3.

If the storage control module pair table 30, the frontend table volume table 31, the mapping table 32, and the frontend target table 33 have been updated as mentioned above, the master cluster control module 25 transmits difference data regarding differences in the storage control module pair table 30, the frontend table volume table 31, the mapping table 32, and the frontend target table 33 before and after being updated, updated in the above-described way, to the respective storage nodes 3 other than its own node in the cluster 7, so as to update the storage control module pair tables 30, the frontend table volume tables 31, the mapping tables 32, and the frontend target tables 33 in the same manner.

The master cluster control module 25 accesses the selected storage control module 21, and stores the same values as values stored in the virtual port number field 31G (FIG. 6) and the internal volume number field 31H (FIG. 6) of the frontend table volume table 31 of its own node, in the virtual port number field 34A (FIG. 9) and the internal volume number field 34B (FIG. 9) of the storage control module configuration information table 34 held in the selected storage control module 21, respectively.

Through the above-described processes, an environment of the selected storage control module 21 in the added storage node 3 is set to be the same as an environment of the movement target storage control module 21 in the storage node 3 in which the movement target storage control module 21 is disposed.

On the other hand, next, the compute node 2 performs a path adding process of setting a path from its own node to the corresponding target TG defined in the added storage node 3 in the adding process in step S44, in response to an instruction given from the management node 4 on the basis of an input operation of the system manager (S46). The compute node 2 transmits a login request for wanting to login to the target TG to the frontend module 20 of the added storage node 3 via the path set in the above-described way (S47).

In a case where the login request is received, the frontend module 20 of the added storage node 3 performs a login process corresponding to the login request (S48), and transmits a process result to the compute node 2 which is a transmission source of the login request (S49).

Figure 15:
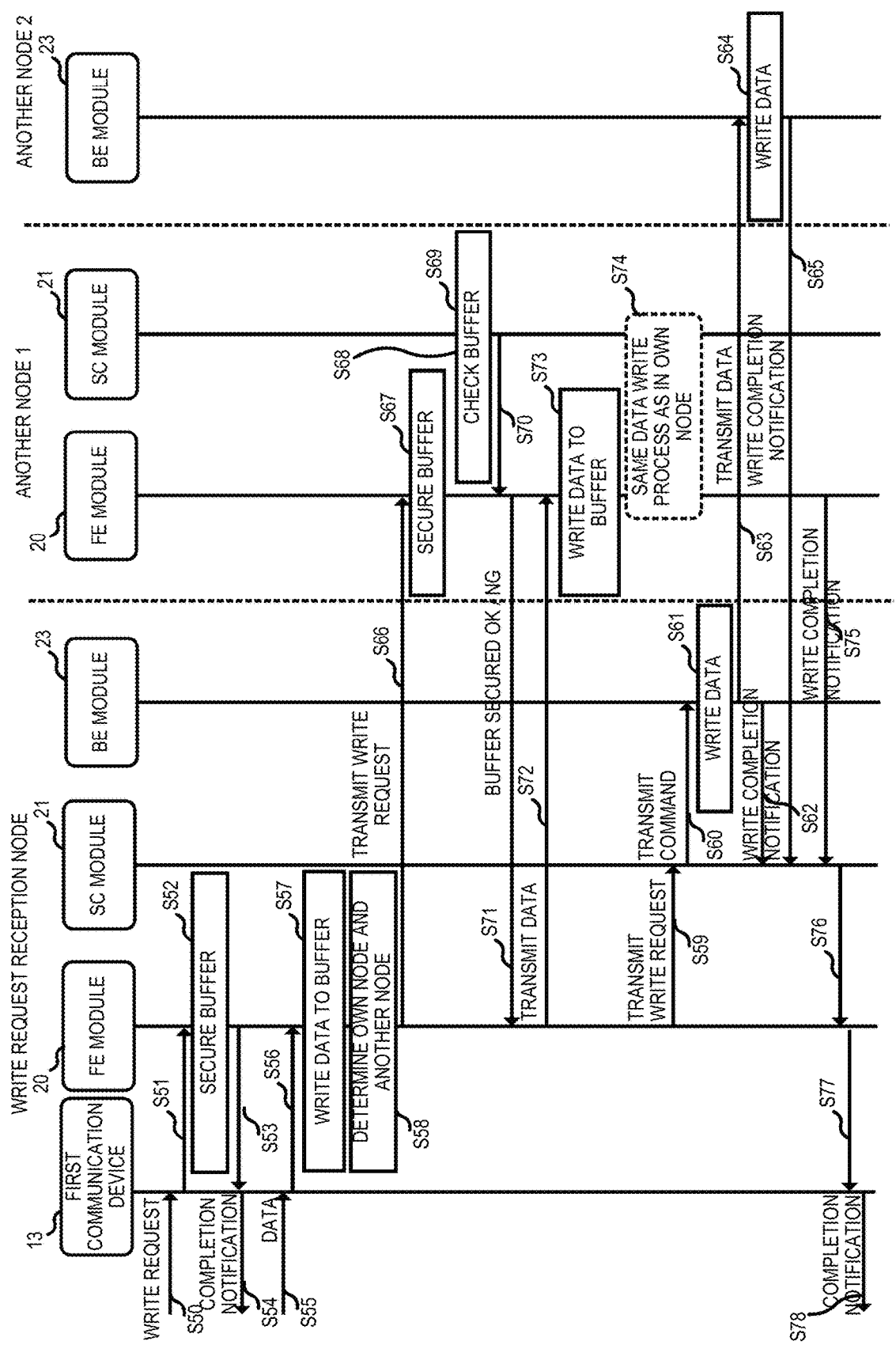
FIG. 15 is a sequence diagram illustrating a flow of write processes performed in the information processing system.

(5) Flow of Write Processes and Read Processes in Present Information Processing System (5-1) Flow of Write Processes Next, a description will be made of a flow of write processes in the information processing system 1. FIG. 15 illustrates a flow of write processes performed in the cluster 7 in a case where a write request is given to any one of storage nodes 3 forming the cluster 7 from the compute node 2. In the following description, the storage node 3 having received a write request in the cluster 7 will be referred to as a "write request reception node" as appropriate.

In the write request, as described above, a volume number of the pool volume GVOL which is a write destination, a leading address of a storage region which is a write destination in the pool volume GVOL, and a data length of write target data (hereinafter, referred to as write data) are designated.

In a case where the write request is received (S50), the first communication device 13 of the "write request reception node" transmits the received write request to the frontend module 20 of its own node (S51). The frontend module 20 secures a buffer region with a necessary capacity on the memory 11 (FIG. 2) on the basis of the transmitted write request (S52), and transmits a completion notification indicating that the buffer region is secured, to the compute node 2 which is a transmission source of the write request via the first communication device 13 (S53 and S54).

Next, in a case where the write data is transmitted from the compute node 2 (S55), the first communication device 13 of the "write request reception node" transmits the write data to the frontend module 20 of its own node (S56).

The frontend module 20 having received the write data stores the write data in the buffer region secured in step S52 (S57), and then determines whether or not write processes based on the write request are processes to be performed in its own node (S58).

This determination is performed by referring to the node number field 32D (FIG. 7) of a row corresponding to the pool volume GVOL designated as a write destination in the write request among the respective rows of the mapping table 32 (FIG. 7). Specifically, in a case where a node number stored in the node number field 32D is a node number of its own node, the frontend module 20 determines that write processes based on the write request are processes to be performed in its own node. In a case where a node number stored in the node number field 32D is a node number of another storage node 3, the frontend module 20 determines that write processes based on the write request are processes to be performed in another storage node 3.

In a case where it is determined that write processes based on the write request are processes to be performed in its own node in step S58, the frontend module 20 acquires a storage control module number stored in the storage control module number field 32E (FIG. 7) of a row corresponding to the pool volume GVOL designated as a write destination in the write request in the mapping table 32 of its own node, and transmits the write request to the storage control module (active storage control module) 21 of its own node assigned with the storage control module number (S59). In this case, the frontend module 20 rewrites the volume number of the pool volume GVOL which is a write destination included in the write request into a volume number of the internal volume IVOL correlated with the pool volume GVOL.

The storage control module 21 having received the write request refers to a management table (not illustrated), and specifies the internal volume IVOL designated as a write destination in the write request, the logical chunk LC (FIG. 4) correlated with a storage region in the internal volume IVOL, and a storage region in the logical chunk LC. The storage control module 21 generates an I/O command in which the logical chunk LC as a write destination of the write data and the storage region in the logical chunk LC, specified in the above-described way, are designated, and transmits the I/O command to the backend module 23 of its own node (S60).

In a case where the I/O command is received, the backend module 23 refers to a management table (not illustrated), and specifies the storage device 12 (FIG. 2) providing each physical chunk PC (FIG. 4) correlated with the logical chunk LC designated in the I/O command. In a case where one of the specified storage devices 12 is present in its own node, the backend module 23 writes the write data into the logical chunk LC designated in the I/O command, and the storage region of the physical chunk PC corresponding to the storage region in the logical chunk LC in the storage device 12 (S61). In a case where the write data has been written to the storage device 12, the backend module 23 transmits a write completion notification to the storage control module (active storage control module) 21 of its own node (S62).

In addition to the process in step S61, the backend module 23 transmits the I/O command and the write data to the corresponding backend module 23 of the storage node 3 (hereinafter, referred to as "another node 2" as appropriate) in which the storage device 12 providing the remaining physical chunks PC correlated with the logical chunk LC is present, via the backend network 6 (S63). As a result, the same write processes as in step S61 is performed in the storage node 3 ("another node 2") (S64), and, in a case where the write processes are completed, a write completion notification is sent to the storage control module 21 of the "write request reception node" via the backend network 6.

In a case where the write completion notification from the backend module 23 of its own node and write completion notifications from the backend modules 23 of all other necessary storage nodes 3 are received, the storage control module 21 of the "write request reception node" notifies the frontend module 20 of a completion notification indicating that the requested write processes are completed (S76). The frontend module 20 having received the completion notification transmits a completion notification indicating that the write processes corresponding to the write request are completed, to the compute node 2 which is a transmission source of the write request via the first communication device 13 and the storage service network 5 (S77 and S78). As mentioned above, a series of write processes based on the write request is finished.

On the other hand, in a case where it is determined that write processes based on the write request are processes to be performed in another storage node 3 in the determination in step S58, the frontend module 20 of the "write request reception node" transmits the write request to the storage node 3 (hereinafter, referred to as "another node 1" as appropriate) assigned with a node number stored in the node number field 32D (FIG. 7) of a row corresponding to the pool volume GVOL designated as a write destination in the write request in the mapping table 32 (FIG. 7) (S66). The write request is transmitted via the backend network 6.

The frontend module 20 of "another node 1" having received the write request secures a buffer region with a necessary capacity on the memory 11 (FIG. 2) of its own node on the basis of the transmitted write request (S67).

Next, the frontend module 20 refers to the mapping table 32 stored in the memory 11 of its own node, and acquires a storage control module number stored in the storage control module number field 32E (FIG. 7) of a row corresponding to the pool volume GVOL designated as a write destination in the write request in the mapping table 32, and transmits the write request to the storage control module (active storage control module) 21 of its own node assigned with the storage control module number (S68). In this case, the frontend module 20 notifies the storage control module 21 of information (hereinafter, referred to as buffer securing information) indicating that a buffer region with a necessary capacity is secured in step S67.

The storage control module 21 having received the write request determines whether or not a buffer region is secured on the basis of the write request and the buffer securing information sent from the frontend module 20 as described above (S69), and transmits a determination result thereof to the frontend module 20 of its own node (S70). Thus, the frontend module 20 having received the determination result transmits a response regarding whether or not a buffer region with a necessary capacity is secured on the memory 11 in step S67 to the frontend module 20 of the "write request reception node" via the backend network 6 (S71).

In a case where the frontend module 20 of "another node 1" cannot secure a buffer region with a necessary capacity on the memory 11, the frontend module 20 of the "write request reception node" having received the response transmits an error notification indicating the fact to the compute node 2 which is a transmission source of the write request via the first communication device 13, and finishes this series of write processes.

In contrast, in a case where the frontend module 20 of "another node 1" can secure a buffer region with a necessary capacity on the memory 11, the frontend module 20 of the "write request reception node" transmits write data to "another node 1" via the backend network 6 (S72).

The frontend module 20 of "another node 1" having received the write data stores the received write data in the buffer region secured in step S67 (S73). Next, the same data write processes as the data write processes described in steps S59 to S61 and steps S63 and S64 are performed in "another node 1" (S74), and, in a case where the data write processes are completed, a write completion notification is transmitted from the frontend module 20 of the "another node 1" to the storage control module 21 of the "write request reception node" via the backend network 6 (S75).

Thus, in this case, if the write completion notification from the backend module 23 of "another node 1" and write completion notifications from the backend modules 23 of all other necessary storage nodes 3 are received, the storage control module 21 of the "write request reception node" notifies the frontend module 20 of its own node of a completion notification indicating that the requested write processes are completed (S76). The frontend module 20 having received the completion notification transmits a completion notification indicating that the write processes corresponding to the write request are completed, to the compute node 2 which is a transmission source of the write request via the first communication device 13 and the storage service network 5 (S77 and S78). As mentioned above, a series of write processes based on the write request is finished.

(5-2) Flow of Read Processes

Figure 16:
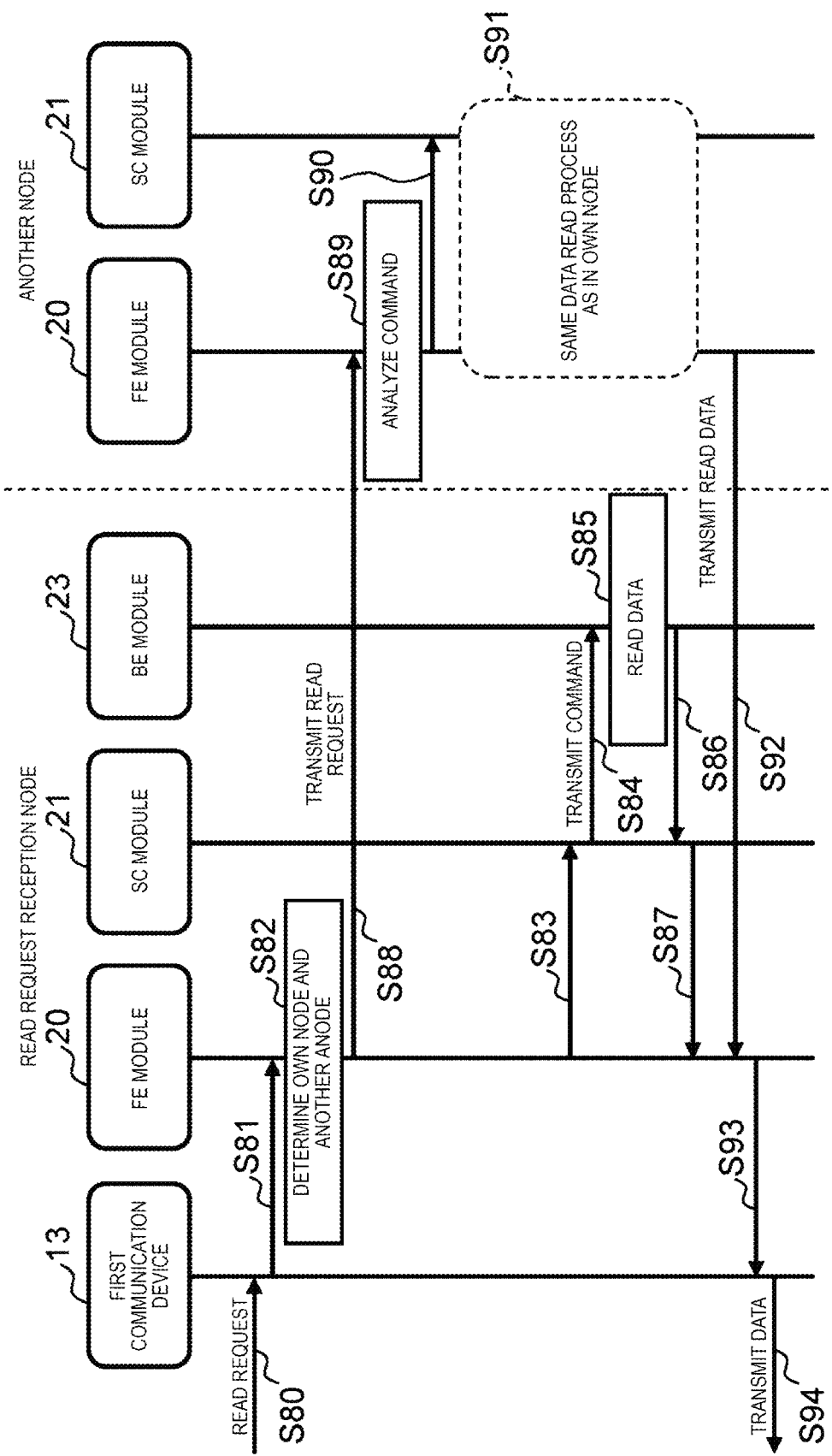
FIG. 16 is a sequence diagram illustrating a flow of read processes performed in the information processing system.

FIG. 16 illustrates a flow of read processes performed in the cluster 7 in a case where a read request is given to any one of storage nodes 3 forming the cluster 7 from the compute node 2. In the following description, the storage node 3 having received a read request in the cluster 7 will be referred to as a "read request reception node" as appropriate.

In the read request, a volume number of the pool volume GVOL which is a read destination, a leading address of a storage region which is a read destination in the pool volume GVOL, and a data length of read target data (hereinafter, referred to as read data) are designated.

In a case where the write request is received (S80), the first communication device 13 of the "read request reception node" transmits the received read request to the frontend module 20 of its own node (S81). The frontend module 20 analyzes the transmitted read request, and determines whether or not read processes based on the read request are processes to be performed in its own node (S82).

This determination is performed by referring to the node number field 32D (FIG. 7) of a row corresponding to the pool volume GVOL designated as a read destination in the read request among the respective rows of the mapping table 32 (FIG. 7). Specifically, in a case where a node number stored in the node number field 32D is a node number of its own node, the frontend module 20 determines that read processes based on the read request are processes to be performed in its own node. In a case where a node number stored in the node number field is a node number of another storage node 3, the frontend module 20 determines that read processes based on the read request are processes to be performed in another storage node 3.

In a case where it is determined that read processes based on the read request are processes to be performed in its own node in step S82, the frontend module 20 acquires a storage control module number stored in the storage control module number field 32E (FIG. 7) of a row corresponding to the pool volume GVOL designated as a read destination in the read request in the mapping table 32 (FIG. 7) stored in the memory 11 (FIG. 2) of its own node, and transmits the read request to the storage control module (active storage control module) 21 of its own node assigned with the storage control module number (S83). In this case, the frontend module 20 rewrites the volume number of the pool volume GVOL which is a read destination included in the read request into a volume number of the internal volume IVOL correlated with the pool volume GVOL.

The storage control module 21 having received the read request refers to a management table (not illustrated), and specifies the internal volume IVOL designated as a read destination in the read request, the logical chunk LC correlated with a storage region in the internal volume IVOL, and a storage region in the logical chunk LC. The storage control module 21 generates an I/O command in which the logical chunk LC as a read destination and the storage region in the logical chunk LC, specified in the above-described way, are designated, and transmits the I/O command to the backend module 23 of its own node (S84).

In a case where the I/O command is received, the backend module 23 refers to a management table (not illustrated), and specifies the storage device 12 providing one physical chunk PC among the physical chunks PC correlated with the logical chunk LC designated in the I/O command. Here, it is assumed that the selected physical chunk PC is provided by the storage device 12 mounted in the "read request reception node". The backend module 23 reads data stored in the logical chunk LC designated in the I/O command, and the storage region of the physical chunk PC corresponding to the storage region in the logical chunk LC in the specified storage device 12 (S85). The backend module 23 transmits the read data to the storage control module 21 of its own node (S86).

The storage control module 21 having received the read data transmits the read data to the frontend module 20 of its own node (S87). The frontend module 20 having received the read data transmits the read data to the compute node 2 which is a transmission source of the read request via the first communication device 13 and the storage service network 5 (S88 and S89). As mentioned above, a series of read processes based on the read request is finished.

On the other hand, in a case where it is determined that read processes based on the read request are processes to be performed in another storage node 3 in the determination in step S82, the frontend module 20 of the "read request reception node" transmits the read request to the storage node 3 (hereinafter, referred to as "another node" as appropriate) assigned with a node number stored in the node number field 32D (FIG. 7) of a row corresponding to the pool volume GVOL designated as a write destination in the write request in the mapping table 32 (FIG. 7) (S90). The read request is transmitted via the backend network 6.

The frontend module 20 of "another node" having received the read request analyzes the received read request (S91). The frontend module 20 refers to the mapping table 32 stored in the memory 11 of its own node, and acquires a storage control module number stored in the storage control module number field 32E (FIG. 7) of a row corresponding to the pool volume GVOL designated as a read destination in the read request in the mapping table 32, and transmits the read request to the storage control module (active storage control module) 21 of its own node assigned with the storage control module number (S92). In this case, a volume number the pool volume GVOL which is a read destination included in the read request is written into a volume number of the internal volume IVOL correlated with the pool volume GVOL.

Next, the same data read processes as the data read processes in steps S84 to S86 are performed in "another node" (S93), and, data (read data) read from the corresponding storage device 12 through the data read processes is transmitted from the frontend module 20 of the "another node" to the frontend module 20 of the "read request reception node" via the backend network 6 (S94).

The frontend module 20 of the "read request reception node" having received the read data transmits the read data to the compute node 2 which is a transmission source of the read request via the first communication device 13 and the storage service network 6 (S88 and S89). As mentioned above, a series of read processes based on the read request is finished.

(6) Effects of Present Embodiment

As mentioned above, in the information processing system 1 of the present embodiment, the internal volume IVOL is created in correlation with the storage control module 21 disposed in each of the storage nodes 3, and the created internal volume IVOL is correlated with the pool volume GVOL provided to the compute node 2 as a storage region for reading/writing data.

In the information processing system 1, in a case where an I/O request from the compute node 2 is given to the storage node 3, the frontend module 20 of the storage node 3 specifies the storage node 3 in which the internal volume IVOL correlated with the pool volume GVOL designated as a read/write destination in the I/O request is disposed, transmits the I/O request to the corresponding storage control module 21 of its own node in a case where the specified storage node 3 is its own node, and transmits the I/O request to another storage node 3 in a case where the specified storage node 3 is another storage node 3.

Therefore, according to the information processing system 1, the compute node 2 can access desired data without being aware of the storage node 3 which is an issue destination of an I/O request regardless of execution of scale-out of the storage node 3. Therefore, according to the present embodiment, it is possible to realize the information processing system 1 having high expandability.

According to the information processing system 1, since the frontend module 20 performs all processes related to scale-out, and the storage control module 21 performs only a process completed in its own node, control software used for an existing storage device may be used as the storage control module 21.

(7) Other Embodiments

In the above-described embodiment, a description has been made of a case where the internal volume IVOL and the pool volume GVOL are correlated with each other on a one-to-one basis, the present invention is not limited thereto, and a plurality of pool volumes GVOL may be correlated with a single internal volume IVOL.

In the above-described embodiment, a description has been made of a case where the present invention is applied to the information processing system 1 configured as in FIG. 1, but the present invention is not limited thereto, and may be widely applied to other types of information processing systems.

In the above-described embodiment, a description has been made of a case where the frontend module 20, the storage control module 21, the backend module 23, and the like of each storage node 3 are configured by software, but the present invention is not limited thereto, and the modules may be configured by hardware.

In the above-described embodiment, a description has been made of a case where the cluster control module 25 is disposed in each of the storage nodes 3, one cluster control module 25 thereof is selected as the master cluster control module 25, and the master cluster control module 25 performs the above-described various processes, but the present invention is not limited thereto, and a server apparatus which functions as the master cluster control module 25 may be provided separately from the storage node 3 without disposing the cluster control module 25 in each storage node 3.

A hypervisor may operate on a server, one or a plurality of virtual machines may operate on the hypervisor, and the various software illustrated in FIG. 3 may operate on the virtual machines. In other words, the various programs (the frontend module 20, the storage control modules 21, capacity control module 22, the backend module 23, the cluster control module 25 and the node control module 26) may operate on hardware of a physical computer, and may also operate on a virtual machine. Similarly, the compute node 2 may be an application program (host program) operating on a virtual machine, and may be a physical host computer. In a case where the information processing system 1 includes a plurality of servers, some of the servers may be located in different sites. Some or all of the servers of the information processing system 1 may be present on a cloud, and may provide services to a user via a network.

There may be a configuration (hyper-converged infrastructure) in which a virtual machine on which various software (the frontend module 20, the storage control modules 21, capacity control module 22, the backend module 23, the cluster control module 25 and the node control module 26) operate and a virtual machine on which a host program operates are present on the same server (node), and there may be a configuration in which the virtual machines are present on different servers connected to each other via a network.

INDUSTRIAL APPLICABILITY

The present invention is widely applicable to systems having various configurations including a plurality of storage nodes.

What is claimed is:

1. A system comprising:
a cluster formed of a plurality of storage nodes,
wherein each of the plurality of storage nodes comprises a storage device and a logical storage region corresponding to the storage device,
wherein, when receiving a logical volume creation instruction based on a request from a management apparatus, one of the plurality of storage nodes creates one or more virtual first logical volumes, each of the one or more virtual first logical volumes being identified within the cluster, within the one of the plurality of storage nodes, wherein the one of the plurality of storage nodes creates one or more virtual second logical volumes, each of the one or more virtual second logical volumes being identified within its own node from the plurality of storage nodes, in its own node from the plurality of storage nodes by correlating the logical storage region in its own node from the plurality of storage nodes with the one or more virtual first logical volumes created in its own node from the plurality of storage nodes, wherein a correspondence relationship between the one or more virtual first logical volumes and the one or more virtual second logical volumes is registered as mapping information, and wherein, when an Input/Output (I/O) request in which the one or more virtual first logical volumes is specified as an I/O destination is received from a host apparatus, the one or more virtual first logical volumes is specified as the I/O destination based on the mapping information.

2. The system according to claim 1, wherein each of the one or more virtual first logical volumes is managed as a pool crossing the respective ones of the plurality of storage nodes forming the cluster.

3. The system according to claim 1, wherein each of the one or more virtual first logical volumes is created in association with a virtual host volume provided from each of the plurality of storage nodes to the host apparatus as a storage region for reading and writing data, and the correspondence relationship between the one or more virtual first logical volumes and the one or more virtual second logical volumes is registered as the mapping information together with the host volume, wherein the I/O request from the host apparatus includes information on the host volume corresponding to the host apparatus.

4. The system according to claim 1, wherein the host volume, target information associated with a physical port of the plurality of storage nodes, and identification information of the host apparatus that is configured to access the target information are registered in association with each other, so that each of the plurality of storage nodes identify the host apparatus to which the I/O request was transferred.

5. The system according to claim 1, wherein the each of the plurality of storage nodes comprises a storage control unit which executes processing of the I/O request from the host apparatus;

wherein the storage control unit is set to form a storage control unit pair with the storage control unit disposed in another storage node from the plurality of storage nodes which is different from its own node from the plurality of storage nodes;

wherein one storage control unit forming the storage control unit pair is set as an active system, and the other storage control unit forming the storage unit control pair is set as a standby system; and wherein the one or more second logical volumes is created at the storage node including the storage control unit which is set as the active system from the plurality of storage nodes.

6. The system according to claim 5, wherein the logical storage region is provided in plurality, logical storage regions of the respective storage nodes belonging to the storage control unit pair are managed as one pool and the one or more virtual second logical volumes is created in correlation with the one pool.

7. The system according to claim 6, further comprising a master cluster control device which executes processing for controlling the cluster, wherein when receiving a request from the management apparatus to create the virtual first logical volume, the master cluster control device selects the storage control unit pair suited to create the one or more virtual first logical volumes and outputs the virtual first logical volume creation instruction to any one of the storage nodes belonging to the selected storage control unit pair; and wherein the storage node which has received the logical volume creation instruction transmits identification information of each of the created one or more virtual first logical volumes and the one or more virtual second logical volumes to the master cluster control device.

8. The system according to claim 7, wherein the master cluster control device selects the storage control unit pair, based on a determination of which storage node from the plurality of storage nodes having a lowest load is set as the active system, and outputs the virtual first logical volume creation instruction to the determined storage node.

9. A control method for a system including cluster formed of a plurality of storage nodes, each of the plurality of storage nodes comprising a storage device and a logical storage region corresponding to the storage device, the control method comprising:

a first step in which one of the plurality of storage nodes that received a logical volume creation instruction based on a request from a management apparatus, creates one or more virtual first logical volumes being identified in the cluster, within the one of the plurality of storage nodes;

a second step of creating one or more virtual second logical volumes, each of the one or more virtual second logical volumes being identified within its own node from the plurality of storage nodes, in its own node from the plurality of storage nodes by correlating the logical storage region in its own node from the plurality of storage nodes with the one or more first logical volumes created in its own node from the plurality of storage nodes; and a third step in which a correspondence between the one or more virtual first logical volumes and the one or more second logical volumes is registered as mapping information;

wherein, when an Input/Output (I/O) request in which the one or more virtual first logical volumes is specified as an I/O destination is received from a host apparatus, the one or more virtual first logical volumes is specified as the I/O destination based on the mapping information.

10. A non-transitory computer readable medium, storing instructions that are executed in a storage node in a system including cluster formed of a plurality of the storage nodes, each of the plurality of storage nodes comprising a storage device and a logical storage region corresponding to the storage device, the instructions comprising:

a first step of creating one or more virtual first logical volumes identifiable in the cluster upon receiving a logical volume creation instruction based on a request from the management device;

a second step of creating one or more virtual second logical volumes, each of the one or more virtual second volumes being identified within its own node from the plurality of storage nodes, in its own node from the plurality of storage nodes by correlating the logical storage region in its own node from the plurality of storage nodes with the one or more first logical volumes created in its own node from the plurality of storage nodes; and a third step in which a correspondence between the one or more virtual first logical volumes and the one or more second logical volumes is registered as mapping information;

wherein, when an Input/Output (I/O) request in which the one or more virtual first logical volumes is specified as an I/O destination is received from a host apparatus, the one or more first logical volumes is specified as the I/O destination based on the mapping information.

* * * * *